(12) United States Patent
Ghosh et al.

(10) Patent No.: US 8,099,556 B2
(45) Date of Patent: Jan. 17, 2012

(54) CACHE MISS DETECTION IN A DATA PROCESSING APPARATUS

(75) Inventors: Mrinmoy Ghosh, Atlanta, GA (US); Emre Özer, Cambridge (GB); Stuart David Biles, Little Thurlow (GB)

(73) Assignee: ARM Limited, Cambridge (GB)

( * ) Notice: Subject to any disclaimer, the term of this patent is extended or adjusted under 35 U.S.C. 154(b) by 974 days.

(21) Appl. No.: 11/990,394

(22) PCT Filed: Sep. 13, 2005

(86) PCT No.: PCT/GB2005/003531
§ 371 (c)(1),
(2), (4) Date: Feb. 13, 2008

(87) PCT Pub. No.: WO2007/031696
PCT Pub. Date: Mar. 22, 2007

(65) Prior Publication Data
US 2009/0222625 A1      Sep. 3, 2009

(51) Int. Cl.
*G06F 12/08* (2006.01)
(52) U.S. Cl. .................. 711/122; 711/141
(58) Field of Classification Search .................. 711/112, 711/141
See application file for complete search history.

(56) References Cited

U.S. PATENT DOCUMENTS

| | | |
|---|---|---|
| 5,909,695 A | 6/1999 | Wong et al. |
| 6,272,520 B1 | 8/2001 | Sharangpani et al. |
| 6,282,614 B1 * | 8/2001 | Musoll ..................... 711/122 |
| 6,338,123 B2 | 1/2002 | Joseph et al. |
| 6,523,109 B1 | 2/2003 | Meier |
| 6,704,845 B2 | 3/2004 | Anderson et al. |
| 6,721,848 B2 | 4/2004 | Gaither |

(Continued)

FOREIGN PATENT DOCUMENTS

EP      0 992 912      4/2000

(Continued)

OTHER PUBLICATIONS

Office Action mailed Jan. 14, 2011 in co-pending U.S. Appl. No. 12/224,671.

(Continued)

*Primary Examiner* — Jared Rutz
(74) *Attorney, Agent, or Firm* — Nixon & Vanderhye P.C.

(57) ABSTRACT

A data processing apparatus and method are provided for detecting cache misses. The data processing apparatus has processing logic for executing a plurality of program threads, and a cache for storing data values for access by the processing logic. When access to a data value is required while executing a first program thread, the processing logic issues an access request specifying an address in memory associated with that data value, and the cache is responsive to the address to perform a lookup procedure to determine whether the data value is stored in the cache. Indication logic is provided which in response to an address portion of the address provides an indication as to whether the data value is stored in the cache, this indication being produced before a result of the lookup procedure is available, and the indication logic only issuing an indication that the data value is not stored in the cache if that indication is guaranteed to be correct. Control logic is then provided which, if the indication indicates that the data value is not stored in the cache, uses that indication to control a process having an effect on a program thread other than the first program thread.

17 Claims, 12 Drawing Sheets

U.S. PATENT DOCUMENTS

| | | |
|---|---|---|
| 6,810,467 B1 | 10/2004 | Khare et al. |
| 6,874,062 B1 | 3/2005 | Goldberg |
| 6,907,520 B2 | 6/2005 | Parady |
| 7,093,079 B2 | 8/2006 | Quach et al. |
| 7,213,106 B1 | 5/2007 | Koster et al. |
| 7,296,158 B2 | 11/2007 | Staddon et al. |
| 7,325,102 B1 | 1/2008 | Cypher |
| 7,392,351 B2 | 6/2008 | Blumrich et al. |
| 2002/0087765 A1 | 7/2002 | Kumar et al. |
| 2003/0026268 A1 | 2/2003 | Navas |
| 2003/0115485 A1 | 6/2003 | Milliken |
| 2003/0208665 A1* | 11/2003 | Peir et al. .................... 711/169 |
| 2004/0088376 A1 | 5/2004 | McCanne et al. |
| 2005/0060457 A1 | 3/2005 | Olukotun |
| 2005/0149734 A1 | 7/2005 | Eronen et al. |
| 2006/0047912 A1 | 3/2006 | Chinnakonda |
| 2006/0064695 A1* | 3/2006 | Burns et al. .................. 718/100 |
| 2007/0186054 A1 | 8/2007 | Kruckemyer et al. |

FOREIGN PATENT DOCUMENTS

| | | |
|---|---|---|
| JP | 1-201740 | 8/1989 |
| WO | WO 2005/017708 | 2/2005 |

OTHER PUBLICATIONS

International Search Report for International Application PCT/GB2005/003531, mailed Aug. 29, 2006.
Written Opinion of the International Searching Authority mailed Aug. 29, 2006.
Peir, J-K et al., "Bloom Filtering Cache Misses for Accurate Data Speculation and Prefetching", ICS' 02, vol. Conference 16, pp. 189-198, (Jun. 22, 2002).
Memik, G. et al., "Just Say No: Benefits of Early Cache Miss Determination", High-Performance Computer Architecture, 2003, pp. 307-316, (Feb. 8, 2003).
Moshovos, A. et al., "Jetty: Filtering Snoops for Reduced Energy Comsumption in SMP Servers", High-Performance Computer Architecture, 2001, pp. 85-96, (Jan. 19, 2001).
C. Saldanha et al, "Power Efficient Cache Coherence" Workshop on Memory Performance Issues in Conjunction with ISCA, Jun. 2001.
M. Ekman et al, "Evaluation of Snoop-Energy Reduction Techniques for Chip-Multiprocessors" Workshop on Duplicating, Deconstructing and Debunking, in Conjunction with ISCA, May 2002.
M. Ekman et al, "TLB and Snoop Energy-Reduction using Virtual Caches in Low-Power Chip-Multiprocessors" ISPLED '02, Aug. 2002.
A. Moshovos, "RegionScout: Exploiting Coarse Grain Sharing in Snoop-Based Coherence" Proceedings of the 32nd Annual International Symposium on Computer Architecture, 2005.
N. Mehta et al, "Fetch Halting on Critical Load Misses" Proceedings of the 22nd International Conference on Computer Design, 2004.
A. Hasegawa et al, "SH3: High Code Density, Low Power" IEEE Micro, 1995, pp. 11-19.
R.E. Kessler et al, "The Alpha 21264 Microprocessor Architecture" IEEE Micro, 19(2):24-36, Apr. 1999.
G. Reinman et al, "Using a Serial Cache for Energy Efficient Instruction Fetching" Journal of Systems Architecture, 2004, pp. 1-21.
B. Calder et al, "Predictive Sequential Associative Cache" 2nd International Symposium on High Performance Computer Architecture, HPCA '96, Feb. 1996.
K. Inoue, et al, "Way-Predicting Set-Associative Cache for High Performance and Low Energy Consumption" ISLPED, 1999.
M. Powell et al, "Reducing Set-Associative Cache Energy via Way-Prediction and Selective Direct-Mapping" Proceedings of the 34th International Symposium in Microarchitecture (MICRO), 2001.
B. Batson et al, "Reactive-Associative Caches" Conference on Parallel Architectures and Compilation, PACT'01, 2001.
A. Ma et al, "Way Memoization to Reduce Fetch Energy in Instruction Caches" Workshop on Complexity Effective Design, Jul. 2001, pp. 1-8.
T. Ishihara et al, "A Way Memoization Technique for Reducing Power Consumption of Caches in Application Specific Integrated Processors" Proceedings of the Design, Automation and Test in Europe Conference and Exhibition, 2005.
R. Min et al, "Location Cache: A Low-Power L2 Cache System" ISLPED'04, Aug. 2004.
D. Nicolaescu et al, "Reducing Power Consumption for High-Associativity Data Caches in Embedded Processors", 2003.
Y. Chang et al, "Sentry Tag: An Efficient Filter Scheme for Low Power Cache" Australian Computer Science Communications, 2002, pp. 135-140.
C. Zhang et al, "A Way-Halting Cache for Low-Energy High-Performance Systems" ISLPED'04, Aug. 2004, pp. 1-6.
Y. Chang et al, "Design and Analysis of Low-Power Cache Using Two-Level Filter Scheme" IEEE Transactions on Very Large Scale Integration (VLSI) Systems vol. 11, No. 4, Aug. 2003, pp. 568-580.
J. Park et al, "Power-Aware Deterministic Block Allocation for Low-Power Way-Selective Cache Structure" IEEE International Conference on Computer Design (ICCD'04), 2004.
D. Albonesi, "Selective Cache Ways: On-Demand Cache Resource Allocation" Journal of Instruction-Level Parallelism 2, May 2000, pp. 1-22.
B. Bloom, "Space/Time Trade-offs in Hash Coding With Allowable Errors" Communications of the ACM, vol. 13, No. 7, Jul. 1970, pp. 422-426.
A. Broder et al, "Network Applications of Bloom Filters: A Survey" 40th Annual Allerton Conference on Communication, Control, and Computing, 2002, Internet Mathematics vol. 1, No. 4, pp. 485-509.
S. Rhea et al, "Probabilistic Location and Routing" IEEE INFOCOM'02, Jun. 2002, pp. 1-10.
S. Dharmapurikar et al, "Deep Packet Inspection Using Parallel Bloom Filters" IEEE Hot Interconnects 12, Stanford, CA, Aug. 2003, pp. 1-8.
A. Kumar et al, "Space-Code Bloom Filter for Efficient Per-Flow Traffic Measurement" Proc. IEEE INFOCOM, 2004.
F. Chang et al, "Approximate Caches for Packet Classification" IEEE INFOCOM'04, Mar. 2004.
S. Cohen et al, "Spectral Bloom Filters" Proceedings of the 2003 ACM SIGMOD International Conference on Management of Data, 2003, pp. 241-252.
S. Sethumadhavan et al, "Scalable Hardware Memory Disambiguation for High ILP Processors" Proceedings of the 36th International Symposium on Microarchitecture (MICRO-36 2003), 2003.
A. Roth, "Store Vulnerability Window (SVW): Re-Execution Filtering for Enhanced Load Optimization" Proceedings of 32nd International Symposium on Computer Architecture (ISCA-32), Jun. 2005, pp. 1-11.
H. Akkary et al, "Checkpoint Processing and Recovery: Towards Scalable Large Instruction Window Processors" Microprocessor Research Labs, Intel Corporation.
L. Fan et al, "Summary Cache: A Scalable Wide-Area Web Cache Sharing Protocol" IEEE/ACM Transactions on Networking, vol. 8, No. 3, Jun. 2000, pp. 281-293.
M. Corliss et al, "Low-Overhead Interactive Debugging via Dynamic Instrumentation with DISE" Proceedings of the 11th Int'l Symposium on High-Performance Computer Architecture (HPCA-11 2005).
P. Zhou et al, "AccMon: Automatically Detecting Memory-related Bugs via Program Counter-based Invariants" Proceedings of the 37th International Symposium on Microarchitecture (MICRO-37 2004).
S. Dharmapurikar et al, "Longest Prefix Matching Using Bloom Filters" SIGCOMM'03, Aug. 2003.
U.S. Appl. No. 11/709,279, filed Feb. 22, 2007, Ozer et al.
U.S. Appl. No. 12/224,725, filed Sep. 4, 2008, Ford et al.
U.S. Appl. No. 12/224,671, filed Sep. 3, 2008, Ford et al.
International Search Report for PCT/GB2006/000795, mailed Nov. 10, 2006.
Written Opinion of the International Searching Authority for PCT/GB2006/000795, mailed Nov. 10, 2006.
International Preliminary Report on Patentability for PCT/GB2006/000795, dated May 27, 2008.
International Search Report for PCT/GB2006/000754, mailed Nov. 7, 2006.
Written Opinion of the International Searching Authority for PCT/GB2006/000754, mailed Nov. 7, 2006.

International Preliminary Report on Patentability for PCT/GB2006/000754, dated May 16, 2008.
Office Action mailed Aug. 15, 2011 in co-pending U.S. Appl. No. 12/224,725.

Fan et al, "Summary Cache: A Scalable Wide-Area Web Cache Sharing Protocol" 1998, SIGCOMM, pp. 254-265.

* cited by examiner

CACHE MISS DETECTION IN A DATA PROCESSING APPARATUS

This application is the U.S. national phase of International Application No. PCT/GB2005/003531, filed 13 Sep. 2005, the entire content of which is hereby incorporated by reference.

FIELD OF THE INVENTION

The present invention relates to the use of cache miss detection techniques in a data processing apparatus.

BACKGROUND OF THE INVENTION

A data processing apparatus will typically include processing logic for executing sequences of instructions in order to perform processing operations on data items. The instructions and data items required by the processing logic will generally be stored in memory, and due to the long latency typically incurred when accessing memory, it is known to provide one or more levels of cache within the data processing apparatus for storing some of the instructions and data items required by the processing logic to allow a quicker access to those instructions and data items. For the purposes of the following description, the instructions and data items will collectively be referred to as data values, and accordingly when referring to a cache storing data values, that cache may be storing either instructions, data items to be processed by those instructions, or both instructions and data items. Further, the term data value is used herein to refer to a single instruction or data item, or alternatively to refer to a block of instructions or data items, as for example is the case when referring to a linefill process to the cache.

Significant latencies can also be incurred when cache misses occur within a cache. In the article entitled "Just Say No: Benefits of Early Cache Miss Determination" by G Memik et al, Proceedings of the Ninth International Symposium on High Performance Computer Architecture, 2003, a number of techniques are described for reducing the data access times and power consumption in a data processing apparatus with multi-level caches. In particular, the article describes a piece of logic called a "Mostly No Machine" (MNM) which, using the information about blocks placed into and replaced from caches, can quickly determine whether an access at any cache level will result in a cache miss. The accesses that are identified to miss are then aborted at that cache level. Since the MNM structures used to recognise misses are significantly smaller than the cache structures, data access time and power consumption is reduced.

The article entitled "Bloom Filtering Cache Misses for Accurate Data Speculation and Prefetching" by J Peir et al, Proceedings of the Sixteenth International Conference of Supercomputing, Pages 189 to 198, 2002, describes a particular form of logic used to detect whether an access to a cache will cause a cache miss to occur, this particular logic being referred to as a Bloom filter. In particular, the paper uses a Bloom filter to identify cache misses early in the pipeline of the processor. This early identification of cache misses is then used to allow the processor to more accurately schedule instructions that are dependent on load instructions that are identified as resulting in a cache miss, and to more precisely prefetch data into the cache. Dependent instructions are those which require as a source operand the data produced by the instruction from which they depend, in this example the data being loaded by a load instruction.

The article entitled "Fetch Halting on Critical Load Misses" by N Mehta et al, Proceedings of the 22nd International Conference on Computer Design, 2004, also makes use of the Bloom filtering technique described in the above article by Peir et al. In particular, this article describes an approach where software profiling is used to identify instructions which are long latency instructions having many output dependencies, such instructions being referred to as "critical" instructions. In particular, the software profiling techniques are used to identify load instructions that will be critical instructions. For any such load instructions, when those instructions are encountered in the processor pipeline, the Bloom filter technique is used to detect whether the cache lookup based on that load instruction will cause a cache miss to occur, and if so a fetch halting technique is invoked. The fetch halting technique suspends instruction fetching during the period when the processor is stalled by the critical load instruction, which allows a power saving to be achieved in the issue logic of the processor.

From the above discussion, it will be appreciated that indication logic has been developed which can be used to provide an early indication of a cache miss when accessing data, with that indication then being used to abort a cache access, and optionally also to perform particular scheduling or power saving activities in situations where there are dependent instructions, i.e. instructions that require the data being accessed.

SUMMARY OF THE INVENTION

Viewed from a first aspect, the present invention provides a data processing apparatus comprising: processing logic operable to execute a plurality of program threads; a cache operable to store data values for access by the processing logic, the processing logic being operable when access to a data value is required whilst executing a first program thread to issue an access request specifying an address in memory associated with that data value, and the cache being operable in response to the address to perform a lookup procedure to determine whether the data value is stored in the cache; indication logic operable in response to an address portion of the address to provide an indication as to whether the data value is stored in the cache, said indication being produced before a result of the lookup procedure is available, and the indication logic being operable to only issue an indication that the data value is not stored in the cache if that indication is guaranteed to be correct; and control logic operable, if the indication indicates that the data value is not stored in the cache, to use said indication to control a process having an effect on a program thread other than the first program thread.

In accordance with the present invention, indication logic is used to provide an indication as to whether the data value is stored in the cache, with this indication being produced before a result of the lookup procedure is available. Further, the indication logic is of the type which will only issue an indication that the data value is not stored in the cache if that indication is guaranteed to be correct. It should be noted that this does not necessarily mean that the converse will always be correct. Hence, whilst if the indication indicates that the data value is not stored in the cache, it will be the case that the cache lookup would result in a cache miss, if instead the indication does not identify that the data value is not stored in the cache, it does not necessarily mean that the data value will be in the cache, and it is still the case that a cache miss may occur. Hence, the indication can produce a safe indication for a cache miss, but will not necessarily produce a safe indication for a cache hit. An example of a technique that can be used to implement the indication logic is the earlier-mentioned Bloom filter technique.

The address portion used by the indication logic may be the entire address of the access request or some subset of the address bits.

In accordance with the present invention, the processing logic is operable to execute a plurality of program threads, and control logic is provided which, if the indication produced by the indication logic for an access request of a first thread indicates that the data value is not stored in the cache, uses that indication to control a process having an effect on a program thread other than the first program thread.

Hence, in accordance with the present invention, the early indication of a cache miss produced by the indication logic in relation to an access request of a particular program thread can be used by the control logic to influence the handling of other program threads, which can lead to significant performance improvements in such multi-threaded systems.

In one embodiment, the data processing apparatus further comprises additional control logic operable in response to said indication to control a process having an effect on the first program thread. In one particular embodiment, this additional control logic is lookup control logic operable in response to said indication to abort the lookup procedure if the indication indicates that the data value is not stored in the cache. Hence, in such embodiments, the data processing apparatus makes multiple uses of the indication produced by the indication logic. In particular, the lookup control logic will abort the lookup procedure if the indication indicates that the data value is not stored in the cache, which can result in significant power savings due to the fact that the indication is produced before the result of the lookup procedure is available. In some embodiments, the indication will be produced before the lookup procedure has even been initiated, whilst in other embodiments the cache may have received the access request and have begun the lookup procedure, but power savings can still be achieved by abortion of the lookup procedure prior to completion. In addition to this use of the indication, if the indication indicates that the data value is not stored in the cache, the earlier-mentioned control logic uses that indication to have an effect on a program thread other than the first program thread. This two-fold approach can produce both power savings and significant performance improvements within the multi-threaded system.

The data processing apparatus can be arranged to handle the multiple program threads in a variety of ways. In one embodiment, the control logic is operable, if the indication indicates that the data value is not stored in the cache, to cause the processing logic to perform a context switch operation in order to switch execution between the first program thread and another program thread. In such embodiments, the early detection of the cache miss when handling the access request of the current thread can be used to invoke an early initiation of a context switch operation, thereby improving the performance of the data processing apparatus by early switching to another program thread in situations where the first program thread is going to incur a latency from the detected cache miss. An example of a data processing apparatus where such an implementation will produce significant performance benefits is in a coarse-grained multi-threading apparatus (also known as "block multi-threading"), where the entirety of the processing resources of the processing logic are switched to the other program thread by the context switch operation.

In another embodiment, the processing logic comprises a number of shared resources, each shared resource being allocatable to one of the program threads, and the control logic is operable, if the indication indicates that the data value is not stored in the cache, to cause the processing logic to perform a reallocation of at least one shared resource. In such embodiments the shared resources can be shared amongst the program threads, and the way in which these resources are allocated amongst the threads can be varied. A processor operating in such a manner is often referred to as a simultaneous multi-threading (SMT) processor. In accordance with this embodiment of the present invention, the control logic is arranged, if the indication indicates that the data value is not stored in the cache, to cause the processing logic to perform a reallocation of at least one shared resource. Hence, if the indication logic determines for an access request of a particular thread that a cache miss is going to occur, that information can be used by the control logic to cause a reallocation of at least one of the shared resources, and hence for example this can be used to free-up that shared resource for use by one or more of the other threads. Since the indication produced by the indication logic occurs before the result of the lookup procedure is available, this reallocation of resources can occur at a relatively early stage. This can lead to significant performance improvements through improved resource utilisation.

In another embodiment, the processing logic comprises a plurality of processors each sharing access to the cache, and each being operable when access to a data value is required to issue an access request specifying an address in memory associated with that data value; the plurality of program threads are distributed across the plurality of processors; the indication logic is operable in response to at least some of the access requests to provide said indication; and the control logic comprises arbitration logic operable to perform an arbitration process to arbitrate access to the cache between the plurality of processors, and being arranged to use the indications provided by the indication logic when performing said arbitration process.

In accordance with this embodiment, a plurality of processors share access to the cache and the plurality of program threads are distributed across the plurality of processors. Hence, for example, certain program threads may be executed by one processor, whilst other program threads are executed by another processor. Arbitration logic is used to arbitrate access to the cache between the plurality of processors, and the indications generated by the indication logic are routed to the arbitration logic for use when performing the arbitration process. There are a number of ways in which these indications could be used by the arbitration logic. However, as an example, an indication that a particular access request will result in a cache miss in the cache can be used to cause the arbitration logic to ignore that particular access request on the basis that it will be aborted, or at the very least to reduce the priority associated with that access request. As a result, the input of the indications from the indication logic into the arbitration logic can significantly reduce contention for access to the cache, and thereby increase the available bandwidth for access to the cache.

In such embodiments, it will be appreciated that the cache can take a variety of forms. For example, in one embodiment, the cache may be a multi-ported cache consisting of multiple cache banks, and in such instances the arbitration logic can be replicated for each cache bank.

In addition, whilst the indication logic may be a single piece of logic used to provide an indication for access requests issued by any of the plurality of processors, in alternative embodiments the indication logic comprises a plurality of indication units, each indication unit being associated with one of said processors and being operable in response to the address portion of an access request issued by the associated processor to provide said indication as to whether the data value is stored in the cache; the control logic being operable to use the indications provided by each of the indication units when performing said arbitration process.

The indication logic can take a variety of forms. In one embodiment, the indication logic comprises: counter logic having a plurality of counter entries, each counter entry containing a count value; vector logic having a vector entry for each counter entry in the counter logic, each vector entry containing a value which is set when the count value in the corresponding counter entry changes from a zero value to a non-zero value, and which is cleared when the count value in the corresponding counter entry changes from a non-zero value to a zero value; index generation logic operable to generate from an address portion of an address at least one index, each index identifying a counter entry and associated vector entry; the index generation logic being operable whenever a data value is stored in, or removed from, the cache to generate from the address portion of the associated address said at least one index, and to cause the count value in each identified counter entry to be incremented if the data value is being stored in the cache or decremented if the data value is being removed from the cache; the index generation logic further being operable for at least some access requests to generate from the address portion of the associated address said at least one index, and to cause the vector logic to generate an output signal based on the value in each identified vector entry, the output signal indicating if the data value of the access request is not stored in the cache.

The actual incrementing or decrementing of the relevant count value(s) can take place at a variety of times during the storage or removal process. For example, the relevant count value(s) can be incremented at the time of allocating a data value to the cache or at some time later when the actual data value is stored as a result of the linefill procedure. Similarly, the relevant count value(s) can be decremented at the time when a data value has been chosen for eviction or at some time later when the data value is overwritten as a part of the linefill process following the eviction.

In accordance with this embodiment, separate counter logic and vector logic are provided within the indication logic, the counter logic being updated based on data values being stored in, or removed from, the cache. In particular, index generation logic generates from an address portion of an address at least one index, with each index identifying a counter entry. The count values in those counter entries are then incremented if data is being stored in the cache or decremented if data is being removed from the cache. The corresponding vector entries in the vector logic can then be queried for access requests using that address portion, in order to generate an output signal which indicates if the data value of the access request is not stored in the cache.

In one embodiment, each index is generated from the address portion using a hash function, and in some embodiments multiple hash functions can be used to generate multiple indexes from a single address portion. However, in one embodiment, a single hash function is used, resulting in the generation of a single index for each address portion.

In one embodiment, a memory hierarchy exists within the data processing apparatus having a number of memory levels, the cache being provided at one of said memory levels, and when processing access requests memory levels higher in the hierarchy being accessed before memory levels lower in the hierarchy, and whilst the vector logic and the counter logic are both associated with the cache, the vector logic is accessible separately to the counter logic and from a different level in the memory hierarchy to that memory level from which the counter logic is accessible. Through such an approach the vector logic can be located within a different part of the data processing apparatus to that in which the counter logic is located. Whilst in one embodiment the index generation logic can be shared between the counter logic and the vector logic, in an alternative embodiment the index generation logic is replicated for both the counter logic and the vector logic, which assists in facilitating the placement of the vector logic at a different location within the data processing apparatus to that in which the counter logic is located.

It should be noted that to generate the output signal indicating if the data value of an access request is not stored in the cache, only the vector logic needs to be accessed. The vector logic is typically significantly smaller than the counter logic, and hence by arranging for the vector logic to be accessible separately to the counter logic and from a different level in the memory hierarchy, this enables the output signal to be generated relatively quickly, and with relatively low power. Furthermore, it is typically the case that the counter logic will be updated more frequently than the vector logic, since a vector entry in the vector logic only needs updating when the count value in the corresponding counter entry changes from a zero value to a non-zero value, or from a non-zero value to a zero value. Hence, by enabling the vector logic to be accessed separately to the counter logic and from a different level in the memory hierarchy, this enables the counter logic to be run at a lower frequency than that at which the vector logic is run, thus producing power savings. Running of the counter logic at a lower frequency is acceptable since the operation of the counter logic is not time critical.

Viewed from a second aspect, the present invention provides a data processing apparatus comprising: processing logic; a cache operable to store data values for access by the processing logic, the processing logic being operable when access to a data value is required to issue an access request specifying an address in memory associated with that data value, and the cache being operable in response to the address to perform a lookup procedure to determine whether the data value is stored in the cache; counter logic having a plurality of counter entries, each counter entry containing a count value; vector logic having a vector entry for each counter entry in the counter logic, each vector entry containing a value which is set when the count value in the corresponding counter entry changes from a zero value to a non-zero value, and which is cleared when the count value in the corresponding counter entry changes from a non-zero value to a zero value; index generation logic operable to generate from an address portion of an address at least one index, each index identifying a counter entry and associated vector entry; the index generation logic being operable whenever a data value is stored in, or removed from, the cache to generate from the address portion of the associated address said at least one index, and to cause the count value in each identified counter entry to be incremented if the data value is being stored in the cache or decremented if the data value is being removed from the cache; the index generation logic further being operable for at least some access requests to generate from the address portion of the associated address said at least one index, and to cause the vector logic to generate an output signal based on the value in each identified vector entry, the output signal indicating if the data value of the access request is not stored in the cache; wherein a memory hierarchy exists within the data processing apparatus having a number of memory levels, the cache being provided at one of said memory levels, and when processing access requests memory levels higher in the hierarchy being accessed before memory levels lower in the hierarchy; and whilst the vector logic and the counter logic are both associated with the cache, the vector logic is accessible separately to the counter logic and from a different level in the memory hierarchy to that memory level from which the counter logic is accessible.

In accordance with this aspect of the present invention, a novel form of indication logic is provided consisting of counter logic, vector logic and index generation logic. The vector logic is accessible separately to the counter logic and from a different level in the memory hierarchy, and when generating an output signal indicating if the data value of the access request is not stored in the cache, only the vector logic needs to be accessed. As mentioned earlier, the output signal from the vector logic can hence be generated quickly and with low power, and the counter logic can be run at a lower frequency than the vector logic, thereby producing power savings. Running of the counter logic at a lower frequency is acceptable since the operation of the counter logic is not time critical.

By such an approach, the indication logic can implement the functionality of a bloom filter type technique, by producing a safe indication of a cache miss, but in a more power efficient and flexible manner. In addition to the power and speed savings mentioned above, the provision of the vector logic separately to the counter logic enables the vector logic to be located in a different part of the data processing apparatus to the counter logic, which can give rise to a number of benefits as will be discussed later.

In one embodiment the index generation logic comprises first index generation logic associated with the counter logic and second index generation logic associated with the vector logic; whenever a data value is stored in, or removed from, the cache the first index generation logic being operable to generate from the address portion of the associated address said at least one index identifying one or more counter entries in the counter logic; and for at least some access requests the second index generation logic being operable to generate from the address portion of the associated address said at least one index identifying one or more vector entries in the vector logic.

The use of separate index generation logic for the counter logic and for the vector logic provides increased flexibility in the separation of the counter logic and the vector logic.

In one embodiment, the data processing apparatus further comprises lookup control logic operable in response to said output signal from the vector logic to abort the lookup procedure if the output signal indicates that the data value is not stored in the cache. Preferably, the vector logic can be accessed such that the output signal is produced before the result of the lookup procedure is available, and hence abortion of the lookup procedure if the output signal indicates that the data value is not stored in the cache can result in significant power savings.

The output signal generated by the vector logic can be used in a variety of ways. However, in one embodiment, the processing logic is operable to execute a sequence of instructions in order, and if the output signal from the vector logic indicates that the data value is not stored in the cache, the processing logic is operable to perform an energy management process to reduce energy consumption of the processing logic whilst waiting for the data value to be accessed. Since in such embodiments the instructions are executed in order, then a cache miss is likely to stall the processing logic for a significant period of time, and by accessing the vector logic a fast and efficient indication of a cache miss can be obtained which enables an early invocation of the energy management process to reduce energy consumption within the processing logic. The energy management process may involve a number of different measures being put in place, and hence for example may involve running the processing logic at a lower processing speed, or fully or partially shutting down elements of the processing logic until such time as the data value has been accessed.

In one embodiment, the data processing apparatus further comprises: an additional cache, if on issuance of the access request by the processing logic a lookup is performed in the additional cache resulting in a miss in the additional cache, the cache being operable to perform said lookup procedure; and if the output signal from the vector logic indicates that the data value is not stored in the cache, at least one of the cache and additional cache being operable to perform an energy management process to reduce energy consumption whilst waiting for the data value to be accessed. Hence, in such embodiments the energy consumption in one or both of the cache and the additional cache can be reduced dependent on the output signal produced by the vector logic. Given the provision of the vector logic separately to the counter logic, the output signal can be generated in a particularly quick and efficient manner, hence enabling the power savings achieved by such an early invocation of the energy management process to be significant. The energy management process applied to the cache(s) can take a variety of forms. However, as an example, the caches can be put in a "drowsy" mode of operation, where the state of the cache, and hence the data stored therein, is retained, but the caches are not accessible whilst in the drowsy mode. This can for example be achieved by reducing the voltage supplied to the caches. To access the cache again, it will typically be necessary to exit the drowsy mode first.

In one embodiment employing an additional cache, the cache and additional cache exhibit inclusive behaviour, and if the output signal from the vector logic indicates that the data value is not stored in the cache the lookup in the additional cache is aborted. Hence, in such embodiments, the cache and additional cache exhibit inclusive behaviour, and hence any data stored in the additional cache will be replicated in the cache. Accordingly, an indication of a miss in the cache will also indicate that a miss will occur in the additional cache. By provision of vector logic separate to the counter logic it is possible to produce the output signal from the vector logic at an early enough stage to enable the cache lookup in the additional cache to be aborted, in addition to any abortion of the lookup in the cache. Hence, significant energy savings can be realised by avoiding lookups in multiple caches. It will be appreciated that this approach can be used when there are more than two levels of cache in the system assuming inclusive behaviour is exhibited between the caches, thereby potentially enabling multiple cache lookups to be aborted, resulting in significant power savings.

In one embodiment, the vector logic is accessible prior to the access request being processed by the memory level in which the cache is provided. Due to the provision of the separate vector logic and counter logic, it is possible in such embodiments to locate the vector logic so that it is accessible before the access request is processed by the memory level in which the cache is provided. This allows a particularly early generation of the output signal and hence enables any actions taken in dependence on that output signal to be initiated at a particularly early stage, thereby increasing the benefits to be realised in terms of power saving, performance improvement, etc.

In one embodiment, the data processing apparatus further comprises an additional cache at a higher memory level than said cache, if on issuance of the access request by the processing logic a lookup is performed in the additional cache resulting in a miss in the additional cache, said cache being operable to perform said lookup procedure; and the vector logic being accessed in response to a cache miss signal issued by the additional cache in the event of a cache miss in the additional cache, thereby causing the vector logic to generate said output signal. Hence, in such embodiments the cache miss signal issued by the additional cache is used to trigger the vector logic to generate the output signal. This can enable the subsequent access to the cache to be aborted at an early stage, and can also in some embodiments enable power management processes to be instigated within the processing logic and the various levels of cache earlier than would otherwise be possible.

In one embodiment having an additional cache at a higher memory level than said cache, said cache and said additional cache exhibit inclusive behaviour, and the vector logic is located within the processing logic and is accessed for every access request, thereby causing the vector logic to generate said output signal. Hence, for embodiments where the caches exhibit inclusive behaviour, the locating of the vector logic within the processing logic enables the output signal to be generated for every access request prior to that access request being issued to the caches within the memory hierarchy. Hence, this enables the cache lookups within those caches to be avoided in situations where the output signal indicates that there will be a cache miss in the cache.

In one embodiment, the processing logic comprises a plurality of processors, each processor being operable when access to a data value is required to issue an access request specifying an address in memory associated with that data value; the cache comprises a plurality of cache portions, each cache portion associated with one of said processors, and each cache portion being accessible by said plurality of processors; separate counter logic, vector logic and index generation logic being provided in association with each cache portion; the vector logic associated with at least one cache portion being accessed for access requests issued by a processor with which the at least one cache portion is not associated.

In such embodiments, the cache comprises of plurality of cache portions and separate counter logic, vector logic and index generation logic is provided in association with each cache portion. The cache portions may be separate cache banks within a cache, or instead may be physically separate. In accordance with this embodiment, the vector logic associated with at least one cache portion is arranged so that it can be accessed for access requests issued by a processor with which the at least one cache portion is not associated. Hence, this processor can get an early indication of a cache miss with a single and fast access to the relevant vector logic. Since in this embodiment each processor can access the cache portions associated with other processors, there is likely to be a significant contention for access to the cache portions, and by adopting the above technique, the number of access requests being propagated to the cache can be reduced, thereby reducing such contention.

The way in which the vector logic is arranged to be accessible by multiple processors can be implemented in a variety of ways. However, in one embodiment the vector logic is replicated for each processor. This will result in each processor having accessing to multiple instances of vector logic, and in such cases these multiple instances of the vector can be accessed simultaneously using the same index generation logic. Hence, with a single access using a single index generation logic, the processing logic will know which cache portions, including the cache portion associated with it, will result in a cache miss, and this information can be used to reduce the number of access to the cache portions.

In one embodiment the cache has a plurality of potential locations where the data value the subject of the access request may reside, when performing the lookup procedure the cache being operable to perform a sequence of lookups, each lookup relating to a subset of said potential locations; and if the output signal from the vector logic indicates that the data value is not in the cache, the sequence of lookups being terminated.

There are many examples of caches where a sequence of lookups needs to be performed in order to look in each of the potential locations where the data value may reside. For example, in a high way set associative cache, the cache may be unable to look in all ways in the same cycle, and accordingly will need to perform a sequence of lookups in order to determine whether the data value is in the cache. By using the vector logic of embodiments of the present invention, the early indication produced by the vector logic can be used to terminate the sequence of lookups if the output signal indicates the data value is not in the cache, i.e. is not in any of the potential locations. This can result in a saving of much of the cache energy that would otherwise be consumed in performing the sequence of lookups. As another example, caches that are accessed using virtual addresses (often referred to as virtual caches) may require a sequence of lookups to take place in order to perform a lookup in each of the potential locations where the data value may reside. This results from the possibility of multiple virtual addresses mapping to the same physical address, often referred to as the synonym problem. Again, the early indication from the output signal can be used to terminate the sequence of lookups early if it is determined that the data value is not in the cache.

Viewed from a third aspect, the present invention provides a method of operating a data processing apparatus having processing logic for executing a plurality of program threads, and a cache for storing data values for access by the processing logic, the method comprising the steps of: when access to a data value is required whilst the processing logic is executing a first program thread, issuing an access request specifying an address in memory associated with that data value; in response to the address, performing a lookup procedure in the cache to determine whether the data value is stored in the cache; in response to an address portion of the address, employing indication logic to provide an indication as to whether the data value is stored in the cache, said indication being produced before a result of the lookup procedure is available, and the indication logic only issuing an indication that the data value is not stored in the cache if that indication is guaranteed to be correct; and if the indication indicates that the data value is not stored in the cache, using said indication to control a process having an effect on a program thread other than the first program thread.

Viewed from a fourth aspect, the present invention provides a method of operating a data processing apparatus, the data processing apparatus comprising processing logic, a cache for storing data values for access by the processing logic, counter logic associated with the cache and having a plurality of counter entries, each counter entry containing a count value, and vector logic associated with the cache and having a vector entry for each counter entry in the counter logic, each vector entry containing a value which is set when the count value in the corresponding counter entry changes from a zero value to a non-zero value, and which is cleared when the count value in the corresponding counter entry changes from a non-zero value to a zero value, the method comprising the steps of: when access to a data value is required by the processing logic, issuing an access request specifying an address in memory associated with that data value; in response to the address, performing a lookup procedure in the cache to determine whether the data value is stored in the cache; whenever a data value is stored in, or removed from, the cache, generating from the address portion of the associated address at least one index, each index identifying a counter entry, and causing the count value in each identified counter entry to be incremented if the data value is being stored in the cache or decremented if the data value is being removed from the cache; for at least some access requests, generating from the address portion of the associated address at least one index, each index identifying a vector entry, and causing the vector logic to generate an output signal based on the value in each identified vector entry, the output signal indicating if the data value of the access request is not stored in the cache; wherein a memory hierarchy exists within the data processing apparatus having a number of memory levels, the cache being provided at one of said memory levels, and when processing access requests memory levels higher in the hierarchy being accessed before memory levels lower in the hierarchy, and said method further comprising the step of accessing the vector logic separately to the counter logic and from a different level in the memory hierarchy to that memory level from which the counter logic is accessible.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
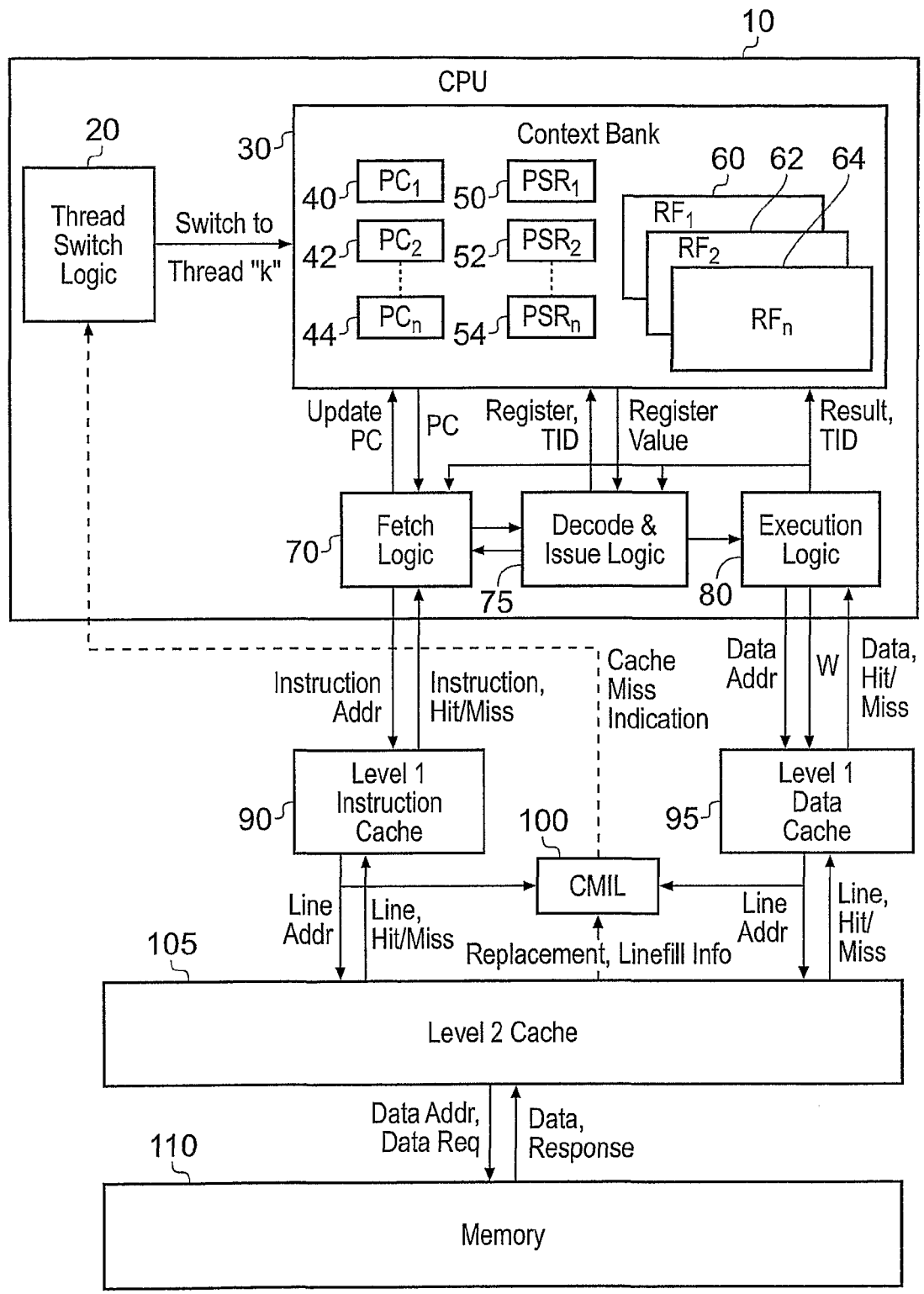
FIG. 1 is a block diagram illustrating application of an early miss indication technique in a coarse grained multi-threaded processor in accordance with one embodiment.

FIG. 1 is a block diagram of a data processing apparatus in accordance with one embodiment. In particular FIG. 1 illustrates a coarse grained multi-threaded processor 10 which includes a processing pipeline consisting of fetch logic 70, decode and issue logic 75 and execution logic 80. At any point in time, this processing pipeline is used to execute a particular program thread. A context bank 30 is provided for maintaining the context for a number of different program threads, and for the particular program thread being handled by the processing pipeline, the various elements of the processing pipeline can obtain the relevant information pertaining to that thread from the context bank 30. Hence, the context bank 30 will include multiple program counter values 40, 42, 44 for the various program threads, multiple program status registers 50, 52, 54 for the various program threads, and multiple register banks 60, 62, 64 for storing the data required when executing instructions of the various program threads.

The fetch logic 70 can then access the relevant program counter value 40, 42, 44 for the particular program thread being executed, and can issue updated program counter values back to the context bank 30. Similarly, the decode and issue logic 75 can output to the context bank 30 a source register identifier and a thread identifier (ID), to cause the required register in one of the register banks 60, 62, 64 to be accessed and for the value in that register to be returned to the decode and issue logic for routing to the execution logic 80. The result value produced by the execution logic can then be routed back to the context bank 30 along with the relevant TID to cause the data value to be stored in the relevant register of the appropriate register bank 60, 62, 64.

The CPU 10 also includes thread switch logic 20 which is used to determine which thread should execute and to cause the appropriate context switch to occur when switching between program threads.

When the fetch logic 70 wishes to retrieve an instruction, it issues an access request identifying an instruction address to the level 1 instruction cache 90. If the instruction is found in that cache, then this is returned to the fetch logic, along with a control signal indicating that there has been a hit. However, if the instruction is not in the cache, then a miss signal is returned to the fetch logic, and the appropriate address for a linefill to the level 1 instruction cache 90 is output to the level 2 cache 105. If there is a hit in the level 2 cache, then the relevant line of instructions is returned to the level 1 instruction cache 90 along with a control signal indicating a hit in the level 2 cache. However, if there is a miss in the level 2 cache, then a miss signal is returned to the level one instruction cache 90, and the line address is propagated from the level 2 cache 105 to memory 110. This will ultimately result in the line of instructions being returned to the level 2 cache and propagated on to the fetch logic 70 via the level 1 instruction cache 90.

Similarly, when the execution logic 80 executes a load or a store instruction, the address of the data to be accessed will be output from the execution logic to the level 1 data cache 95. In the event of a store operation, this will also be accompanied by the write data to be stored to memory. The level 1 data cache 95 will issue a hit/miss control signal to the execution logic 80 indicating whether a cache hit or a cache miss has occurred in the level 1 data cache, and in the event of a load operation which has hit in the cache will also return the data to the execution logic 80. In the event of a cache miss in the level 1 data cache, the line address will be propagated onto the level 2 cache 105, and in the event of a hit the line of data values will be accessed in the level 2 cache. For a load this will cause the line of data values to be returned to the level 1 data cache 95 for storing therein. In the event of a miss in the level 2 cache 105, the line address will be propagated onto memory 110 to cause the line of data to be accessed in the memory.

In accordance with the embodiment described in FIG. 1, cache miss indication logic 100 is provided which receives any line addresses output by either the instruction cache 90 or the data cache 95, and in response to that line address information determines whether a miss in the level 2 cache 105 will occur. The indication produced by the cache miss indication logic 100 will be produced before the result of the lookup procedure in the level 2 cache 105 is available, and that cache miss indication will be routed to the thread switch logic 20 within the CPU 10. If the cache miss indication indicates that a miss will occur in the level 2 cache 105 then the thread switch logic 20 is arranged to perform a context switch operation in order to switch execution between the current program thread and another program thread. As a result, it will issue a control signal to the context bank 30 to cause the context of the current thread to be saved, after which the pipeline processing logic will start executing the designated new thread.

The early cache miss indication produced by the cache miss indication logic 100 can hence be useful in starting the process of a context switch earlier than may otherwise be possible, thereby improving the performance of the processor by starting the next thread earlier.

The cache miss indication logic 100 can take a variety of forms, but is arranged to provide a safe indication of a cache miss. Accordingly, if the cache miss indication indicates that there will be a cache miss in the level 2 cache, then this is guaranteed to be correct, as opposed to being a mere prediction. However, in one embodiment, if the cache miss indication is unable to determine that there will be a cache miss, this does not necessarily mean that there will not be a cache miss, and accordingly the cache miss indication logic does not provide a safe indication of a cache hit.

In one embodiment, the cache miss indication logic 100 uses a bloom filter technique and maintains information which is updated each time a data value is stored in, or removed from, the level 2 cache 105, based on replacement and linefill information routed to the cache miss indication logic 100 from the level 2 cache 105. More details of one particular embodiment of the cache miss indication logic 100 will be discussed in detail later.

Whilst the cache miss indication logic 100 has been shown in FIG. 1 as being accessed based on the line addresses issued by the level 1 instruction cache 90 or data cache 95, it could instead be located so as to be accessed based on the instruction address issued by the fetch logic 70 and/or the data address issued by the execution logic 80. This may for example be an appropriate location if the level 1 and level 2 caches employ inclusive behaviour, such that an indication of a miss in the level 2 cache will also indicate a miss in the level 1 cache. In such instances, the cache miss indication produced by the cache miss indication logic 100 can produce an earlier indication for routing to the thread switch logic 20.

Figure 2:
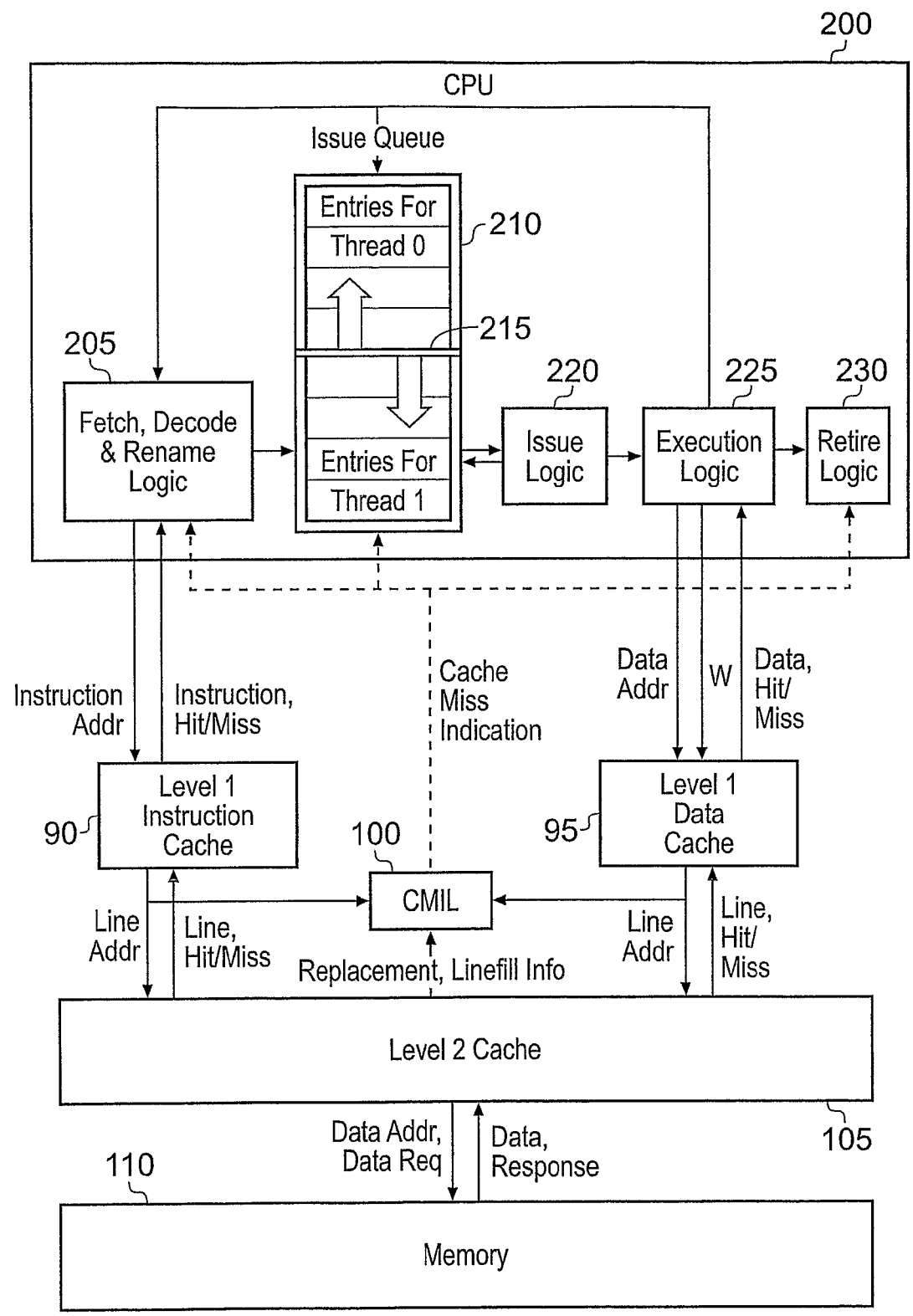
FIG. 2 is a block diagram illustrating application of the early cache miss indication technique in a simultaneous multi-threaded processor of one embodiment.

FIG. 2 is a block diagram of a data processing apparatus in accordance with an alternative embodiment of the present invention, where the CPU 200 takes the form of a simultaneous multi-threaded (SMT) processor. The core 200 consists of fetch, decode and rename logic 205, an issue queue 210, issue logic 220, execution logic 225, and retire logic 230. A number of these logic blocks have resources that are shared by multiple program threads. Examples of such shared resources are the fetch queue in the fetch, decode and rename logic 205, the issue queue 210 and a shared register file within the retire logic 230. For simplicity, FIG. 2 only illustrates the sharing of the issue queue 210 in detail for a two-way SMT processor.

As illustrated in FIG. 2, the issue queue 210 has a partition 215 to divide entries of two threads for the two-way SMT. For an n-way SMT, the issue queue 210 would have n−1 partitions. The arrows illustrated next to the partition 215 in FIG. 2 illustrate that the location of the partition 215 can be varied. In particular, the partition can be moved in either direction to increase or decrease entries allocated to each thread.

The instruction cache 90, data cache 95, level 2 cache 105, memory 110 and cache miss indication logic 100 operate in an analogous manner to that described earlier with reference to FIG. 1. However, in the example of FIG. 2, the cache miss indication from the cache miss indication logic 100 is routed to the fetch, decode and rename logic 205, the issue queue 210 and the retire logic 230 to control reallocation of the shared resources therein. In particular, if for a particular thread a cache miss indication is produced indicating that an access request of that thread will cause a cache miss in the level 2 cache 105, that indication can be used by these various logic elements to control repartitioning of the shared resources. Considering by way of example the issue queue 210, if the cache miss indication from the cache miss indication logic 100 indicates that an access for thread 0 is going to result in a level 2 cache miss 105, the issue queue 210 may use this information to slide the partition 215 so as to allocate more of the shared resource to thread 1. Similar processes can also take place within the fetch, decode and rename logic 205 in relation to the fetch queue, and within the retire logic 230 in relation to the shared register file.

Whilst the cache miss indication logic 100 has been illustrated in FIG. 2 as being responsive to the line address outputs from the level 1 instruction cache 90 and data cache 95, in an alternative embodiment the cache miss indication logic 100 may be located between the CPU 200 and the level 1 caches, and accessed based on the instruction address issued by the fetch, decode and rename logic 205 or the data address issued by the execution logic 225.

For either placement of the cache miss indication logic 100, the early cache miss indication produced by the cache miss indication logic 100 can be used to cause an early reallocation of shared resources, thereby helping in freeing-up resources for use by other threads. This can lead to significant performance improvements within the SMT system.

Whilst not explicitly shown in FIG. 1 or FIG. 2, the cache miss indication produced by the cache miss indication logic 100 can also be routed to the level 2 cache to cause the associated access request to be aborted within the level 2 cache if the cache miss indication indicates that a cache miss will occur.

Figure 3:
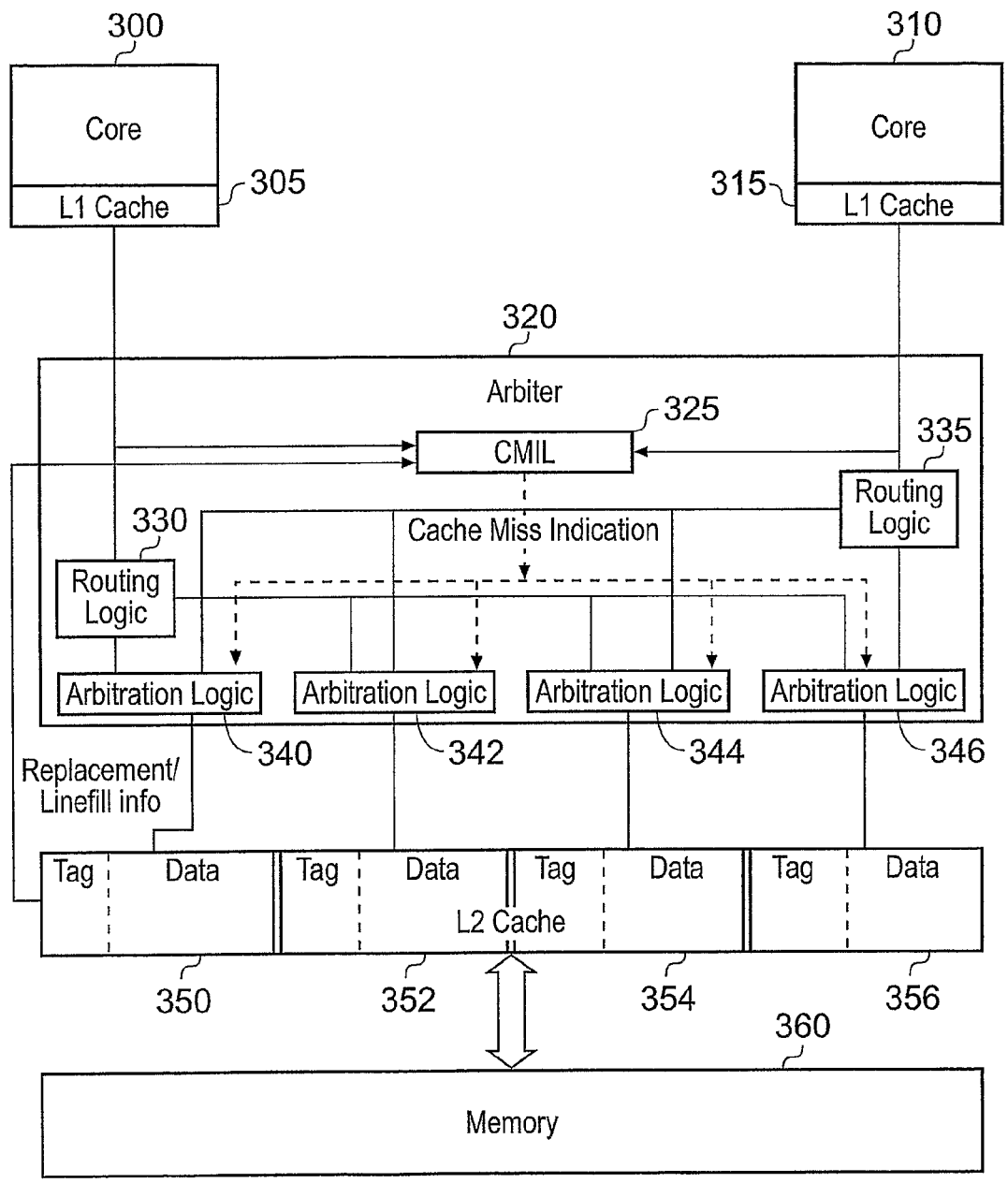
FIG. 3 is a block diagram illustrating application of the early cache miss indication technique in a chip multi-processor of one embodiment.

FIG. 3 is a block diagram of an alternative embodiment of the present invention where the data processing apparatus has multiple processor cores 300, 310, each having their own level 1 caches 305, 315, respectively, but each sharing access to a level 2 cache. Such a system will be referred to herein as a chip multi-processor (CMP) system. Whilst only two cores 300, 310 are shown in FIG. 3, the techniques illustrated can be used for a CMP system having any number of cores.

As shown in FIG. 3, each core 300, 310 has an associated level 1 cache 305, 315 and in the event of a miss in the level 1 cache, an access request is propagated onto the level 2 cache via the arbiter logic 320. The job of the arbiter logic 320 is to arbitrate between multiple access requests seeking access to the level 2 cache.

For the purposes of illustration, the level 2 cache is shown as a multi-ported cache having multiple cache banks 350, 352, 354, 356, each cache bank having its associated tag portion and data portion. Within the arbiter logic 320, separate arbitration logic 340, 342, 344, 346 is provided for each cache bank. Routing logic 330, 335 within the arbiter 320 is arranged based on the received access requests to route those access requests to the appropriate arbitration logic 340, 342, 344, 346, dependent on which cache bank 350, 352, 354, 356 is to be accessed.

Cache miss indication logic 325 is provided within the arbiter logic 320 which, based on the address information associated with each access request routed to the arbiter 320, determines if a cache miss in the level 2 cache will occur, and outputs that cache miss indication to one or more of the arbitration logic units 340, 342, 344, 346. Each arbitration logic then takes that cache miss indication information into account when arbitrating access to the associated cache bank.

Hence, by way of example, if the arbitration logic 340 is seeking to arbitrate between an access request issued by the core 300 and an access request issued by the core 310, and the cache miss indication logic 325 indicates that the access request from the core 300 will result in a cache miss in the level 2 cache bank 350, then the arbitration logic 340 will be arranged to grant access to the cache bank 350 to the access request issued by the core 310. This can be achieved in a variety of ways. For example, the arbitration logic 340 may be arranged to merely ignore the access request issued by the core 300.

As shown in FIG. 3, the cache miss indication logic 325 receives from the level 2 cache the replacement and linefill information used to maintain the necessary information within the cache miss indication logic required to produce the cache miss indication.

Whilst in FIG. 3 the cache miss indication logic 325 is shown residing within the arbiter 320, in an alternative embodiment separate cache miss indication logic can be provided in association with each core 300, 310, and in particular can be arranged to review any access requests output to the arbiter 320 from the associated core in order to produce the corresponding cache miss indication. The cache miss indications output by each cache miss indication logic can then be routed to the relevant arbitration logic units 340, 342, 344, 346 within the arbiter 320.

The use of the cache miss indication logic 325 as shown in FIG. 3 can significantly reduce the number of accesses to the level 2 cache, and for a particular modelled example has been shown to reduce the accesses by about 30%. Hence, it can be seen that such an approach reduces contention for the level 2 cache, and as a result can increase the available bandwidth for accessing the level 2 cache.

The cache miss indication logic 100, 325 shown in FIGS. 1, 2 and 3 can be implemented in a variety of ways, but its main purpose is to produce the indication before a result of the lookup procedure in the level 2 cache is available, and furthermore the indication logic will only issue an indication that the data value is not stored in the cache if that indication is guaranteed to be correct, i.e. an indication of a cache miss is a safe indication, rather than merely a prediction. In one particular embodiment, the cache miss indication logic uses a Bloom filter technique.

Bloom Filters were named after Burton Bloom for his seminal paper entitled "Space/time trade-offs in hash coding with allowable errors", Communications of the ACM, Volume 13, Issue 4, July 1970. The purpose was to build memory efficient database applications. Bloom filters have found numerous uses in networking and database applications in the following articles:

A. Border and M. Mitzenmacher, "Network application of Bloom Filters: A Survey", in 40th Annual Allerton Conference on Communication, Control, and Computing, 2002;

S. Rhea and J. Kubiatowicz, "Probabilistic Location and Routing", IEEE INFOCOM'02, June 2002;

S. Dharmapurikar, P. Krishnamurthy, T. Sproull and J. Lockwood, "Deep Packet Inspection using Parallel Bloom Filters", IEEE Hot Interconnects 12, Stanford, Calif., August 2003;

A. Kumar, J. Xu, J. Wang, O. Spatschek, L. Li, "Space-Code Bloom Filter for Efficient Per-Flow Traffic Measurement", Proc. IEEE INFOCOM, 2004;

F. Chang, W. Feng and K. Li, "Approximate Caches for Packet Classification", IEEE NFOCOM'04, March 2004;

S. Cohen and Y. Matias, "Spectral Bloom Filters", Proceedings of the 2003 ACM SIGMOD International Conference on Management of Data, 2003; and L. Fan, P. Cao, J. Almeida, and A. Broder, "Summary cache: A scalable wide-area Web cache sharing protocol," IEEE/ACM Transactions on Networking, vol. 8, no. 3, pp. 281-293, 2000.

For a generic Bloom filter, a given address portion in N bits is hashed into k hash values using k different random hash functions. The output of each hash function is an m-bit index value that addresses a Bloom filter bit vector of $2^m$. Here, m is typically much smaller than N. Each element of the Bloom filter bit vector contains only 1 bit that can be set. Initially, the Bloom filter bit vector is zero. Whenever an N-bit address is observed, it is hashed to the bit vector and the bit value hashed by each m-bit index is set.

When a query is to be made whether a given N-bit address has been observed before, the N-bit address is hashed using the same hash functions and the bit values are read from the locations indexed by the m-bit hash values. If at least one of the bit values is 0, this means that this address has definitely not been observed before. If all of the bit values are 1, then the address may have been observed but this cannot be guaranteed. The latter case is also called a false hit.

As the number of hash functions increases, the Bloom filter bit vector is polluted much faster. On the other hand, the probability of finding a zero during a query increases if more hash functions are used.

Recently, Bloom filters have been used in the field of computer micro-architecture. Sethumadhvan et al in the article "Scalable Hardware Memory Disambiguation for High ILP Processors", Proceedings of the 36th International Symposium for Microarchitecture pp. 399-410, 2003, uses Bloom Filters for memory disambiguation to improve the scalability for load store queues. Roth in the article "Store Vulnerability Window (SVW): Re-Execution Filtering for Enhanced Load Optimization", Proceedings of the $32^{nd}$ International Symposium on Computer Architecture (ISCA-05), June 2005, uses a Bloom filter to reduce the number of load re-executions for load/store queue optimizations. Akkary et al in the article "Checkpoint Processing and Recovery: Towards Scalable Large Instruction Window Processors", Proceedings of the 36th International Symposium for Microarchitecture, December, 2003, also uses a Bloom filter to detect the load-store conflicts in the store queue. Moshovos et al in the article "JETTY: Snoop filtering for reduced power in SMP servers", Proceedings of International Symposium on High Performance Computer Architecture (HPCA-7), January 2001, uses a Bloom filter to filter out cache coherence requests or snoops in SMP systems.

In the embodiments described herein the Bloom filter technique is employed for the purpose of detecting cache misses. In one particular embodiment, a counting Bloom filter technique is used. The counting Bloom Filter has one counter corresponding to each bit in the bit vector of a normal Bloom Filter. The counting Bloom Filter can be arranged to track addresses entering and leaving a cache. Whenever there is a line fill in the cache, the counters corresponding to the hashes for the address are incremented. In the case of a cache replacement, the corresponding counters are decremented. If the counter is zero, the address has never been seen before. If the counter is greater than one, the address may have been encountered.

Figure 5:
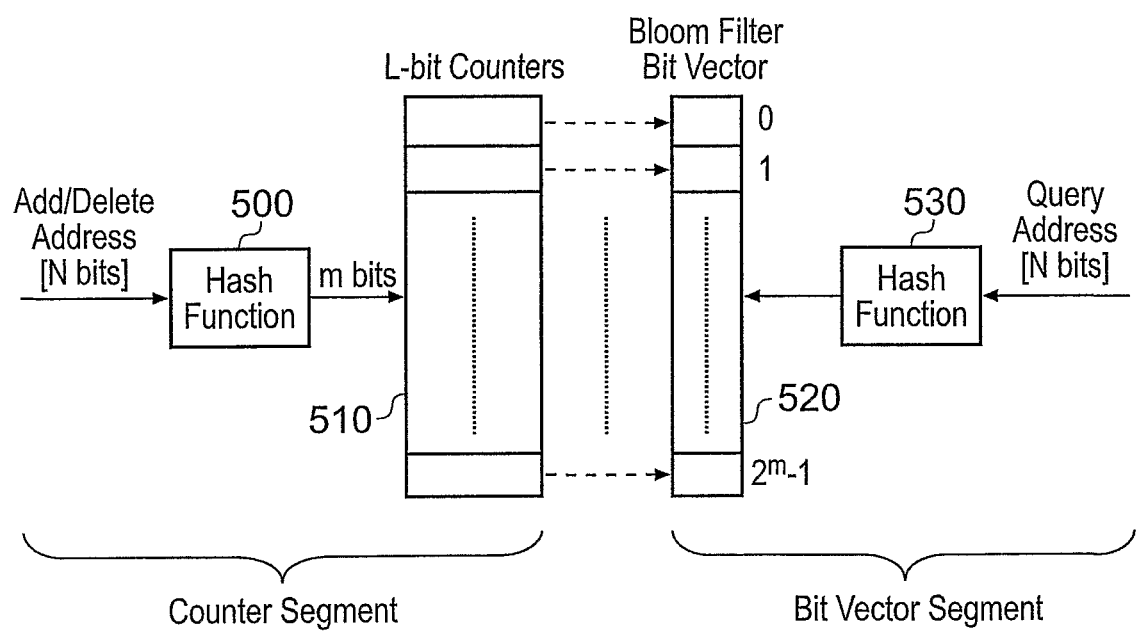
FIG. 5 is a diagram schematically illustrating in more detail the segmented counting bloom filter of FIG. 4.

In one particular embodiment, a segmented counting Bloom filter design is used. In accordance with this novel segmented approach, the cache miss indication logic has counter logic and separate vector logic as illustrated schematically in FIG. 5. The counter logic 510 has a plurality of counter entries, with each counter entry containing a count value, and the vector logic 520 has a vector entry for each counter entry in the counter logic 510, each vector entry containing a value (preferably a single bit) which is set when the count value in the corresponding counter entry changes from a zero value to a non-zero value, and which is cleared when the count value in the corresponding counter entry changes from a non-zero value to a zero value.

Whenever a data value is stored in, or removed from, the cache, a portion of the associated address is provided to the hash function 500 which generates an m-bit index identifying a particular counter in the counter logic 510. This counter value is then incremented if a data value is being stored in the cache, or is decremented if a data value is being removed from the cache. For certain access requests, the cache miss indication logic can then be accessed by issuing the relevant address portion to the hash function 530 to cause an index to be generated identifying a particular vector entry in the vector logic 520. If the value in that vector entry is not set, then this indicates that the data value is not present in the cache, and accordingly a cache miss indication can be generated indicating that the data value is not stored in the cache. If in contrast the vector entry is set, then the data value may or may not be in the cache.

Multiple hash functions can be provided so as to cause multiple counter entries or multiple vector entries to be accessed dependent on each address. However, in one embodiment, only a single hash function is used to form the index generation logic used to generate the index into the either the counter logic or the vector logic, but this index generation logic is replicated separately for the counter logic and the vector logic, thereby facilitating placement of the vector logic in a part of the apparatus separate to the counter logic. It has been found that having one hash function produces false hit rates (i.e. indications which are inconclusive) similar to the rates achieved when having more than one hash function. The number of bits "L" provided for each counter in the counter logic depends on the hash functions chosen. In the worst case, if all cache lines map to the same counter, the bit-width of the counter must be at most $\log_2(\# \text{ of cache lines})$. One form of hash function that can be used in one embodiment involves bitwise XORing of adjacent bits. A schematic of this hash function which converts a 32 bit address to a m bit hash is shown in FIG. 8.

Figure 8:
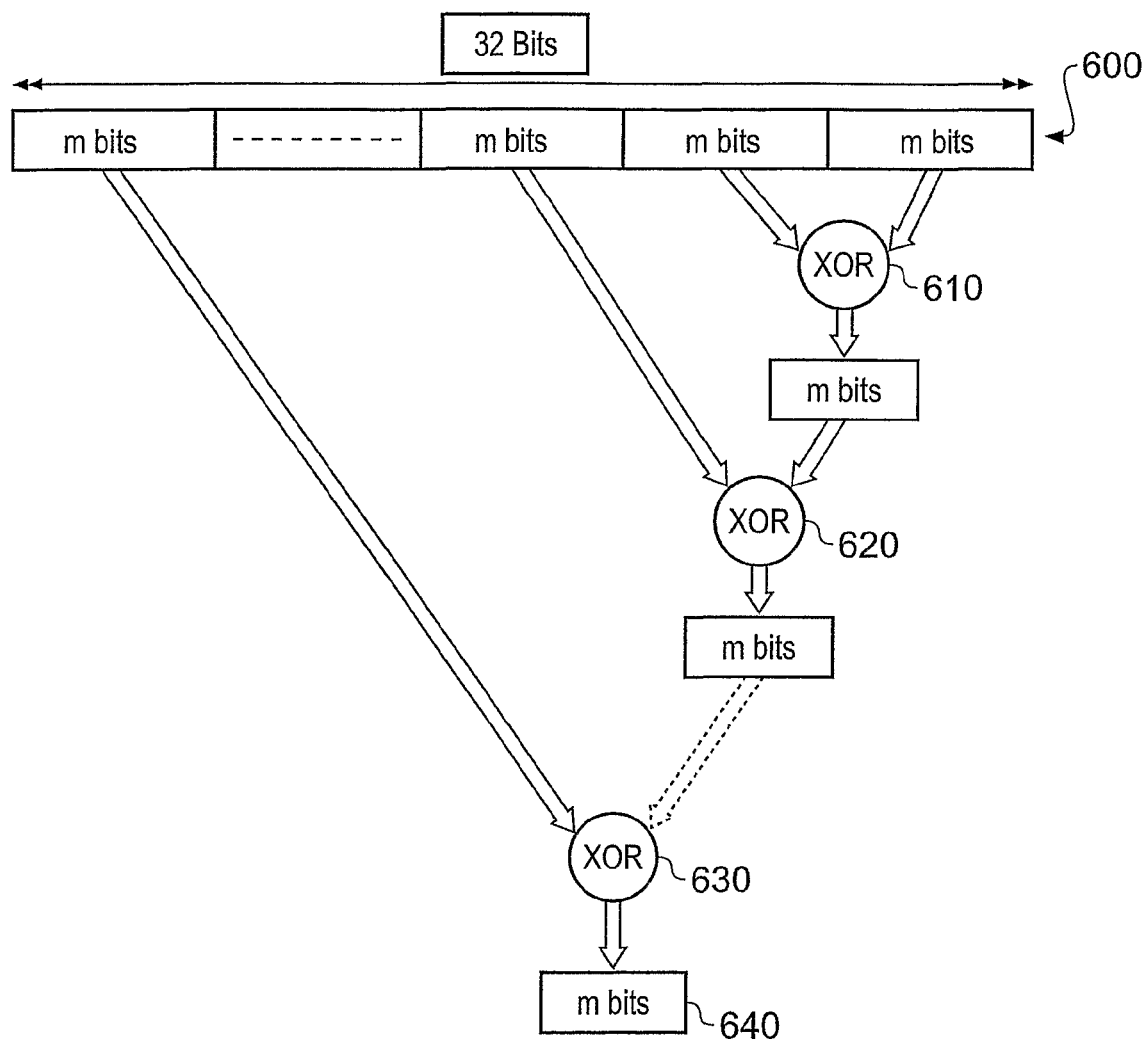
FIG. 8 is a diagram schematically illustrating the operation of the hash function illustrated in FIG. 5 in accordance with one embodiment.

As shown in FIG. 8, each pair of m bits in the address is passed through an XOR function 610, 620, 630 so as to ultimately reduce the address 600 to a single m-bit index 640.

Another simplistic hash function that may be chosen uses the lower $\log_2(N)$ bits of the block address (N is the size of the bloom filter). It can be proven with this hash function that the number of bits per counter is equal to $\log_2(\text{Associativity of cache})$. Other simple hash functions could be chosen, such as Hash=Addr % Prime, where Prime is the greatest prime number less than N.

As mentioned earlier, the segmented design provides separate counter logic 510 and bit vector logic 520. There are several benefits realised by such a segmented design. Firstly, to know the outcome of a query to the Bloom filter, only the bit vector logic 520 needs to be accessed, and its size is smaller than the counter logic 510. Keeping the bit vectors separate hence enables faster and lower power accesses to the Bloom Filter. In addition, updates to the counter logic 510 are much more frequent than updates to the bit vector logic 520. Thus segmenting the counter logic and the bit vector logic allows the counter logic to be run at a much lower frequency than the bit vector logic, which is acceptable since the operation of the counter logic is not time critical. In particular, the bit vector logic only needs updating if a particular counter entry in the counter logic changes from a non-zero value to a zero value, or from a zero value to a non-zero value.

Hence, the use of such a segmented design to form the cache miss indication logic 100 used in the embodiments of FIGS. 1 to 3 leads to a particularly efficient approach for generating an early cache miss indication for use by the data processing apparatus embodiments illustrated in those figures.

Figure 4:
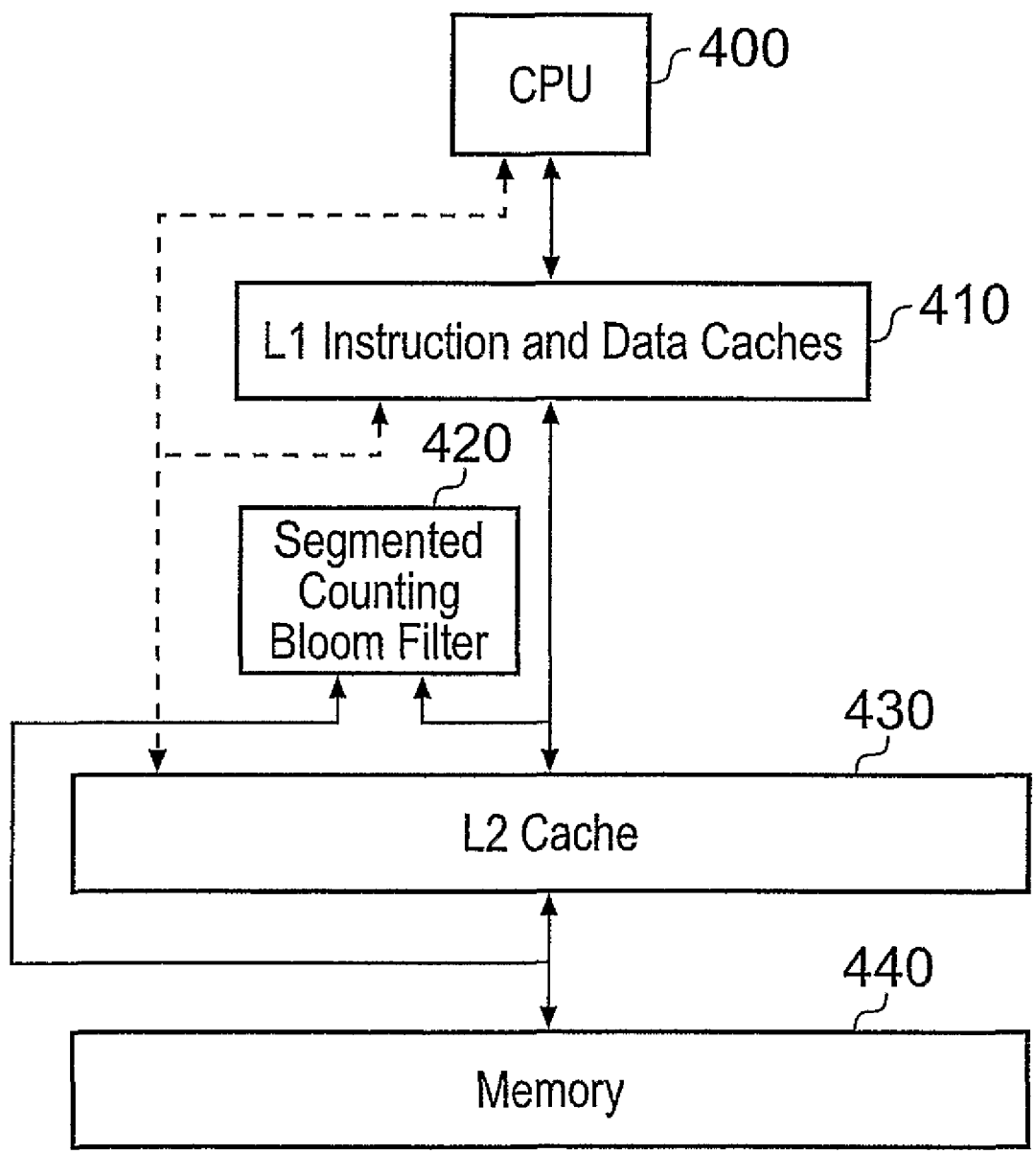
FIG. 4 is a block diagram schematically illustrating the use of a segmented counting bloom filter in a data processing apparatus in accordance with one embodiment.

Whilst the embodiments of FIGS. 1 to 3 all involve the use of the indication produced by the cache miss indication logic to control a process having an effect on a program thread other than a program thread whose access request caused the indication to be generated, it has also been found that the particular segmented counting Bloom filter technique described above can provide particularly beneficial results when employed within a data processing apparatus irrespective of whether multiple program threads are being executed or not. FIG. 4 illustrates a general data processing apparatus in which the segmented counting Bloom filter 420 of one embodiment can be used. In this example, a CPU 400 is shown coupled to external memory 440 via two levels of cache, namely the level 1 (L1) cache 410, which may be a unified cache or may provide separate instruction and data caches, and the level 2 (L2) cache 430, which again may provide separate instruction and data caches, but more usually will be formed as a unified cache.

The increasing complexity and frequencies of present day microprocessors has led to energy becoming an important design constraint. Techniques to save energy may be applied at the circuit level or at the architecture level. The embodiment illustrated schematically with reference to FIG. 4 describes an architecture level technique to save energy in the core and the caches of a microprocessor by early detection of a miss in the L2 Cache.

In one embodiment, energy in an in-order microprocessor can be saved without loss of performance. In an in-order processor, severe stalls in the core 400 may occur due to an L2 Cache miss on a load operation. This is because after a data access misses the L2 cache 430, it accesses the DRAM memory 440. Since a DRAM memory is much slower than caches, a memory access may take more than 100 cycles depending on the processor frequency before the data returns. A good way to save energy here would be to use the event of an L2 Cache miss as a trigger to perform an energy management process on the core. However such a trigger may only be obtained after it is known that the access would miss the L2 Cache. The time taken to access a L2 Cache depends on the size and whether the cache in on chip or off chip. A typical estimate of an L2 cache access time is more than 10 cycles.

However, in accordance with the embodiment used in FIG. 4, the segmented counting Bloom filter 420 can be used to produce an early indication of the level 2 cache miss by snooping all accesses to the level 2 cache 430 from the level 1 cache 410. As discussed earlier, the Bloom filter 420 can provide an indication which will either identify that the data value associated with the address is definitely not present in the level 2 cache 430, or instead may identify that the data value the subject of the address may be in the level 2 cache. As shown schematically by the dotted lines in FIG. 4, if the segmented counting Bloom filter 420 can determine that the data value is definitely not present in the level 2 cache, then energy can be saved by doing one or more of the following:

i) performing an energy management process on the processor core 400;
ii) turning the level 1 cache 410 and the level 2 cache 430 drowsy, i.e. putting them into a low power state preserving mode; and/or
iii) preventing the level 2 cache 430 access at an early stage.

By early detection of the cache miss it is also possible to reduce the bus activity between the level 1 and level 2 caches and therefore reduce the bus power.

There will be some overhead incurred as a result of turning on and turning off the various logic units. However, this overhead would typically not be much of a concern because the turn-off period happens during a memory access that may take hundreds of cycles. Also, since it is known exactly when the data would return from memory, the structures which have been turned off may be turned on slowly in stages to save energy.

Figure 6:
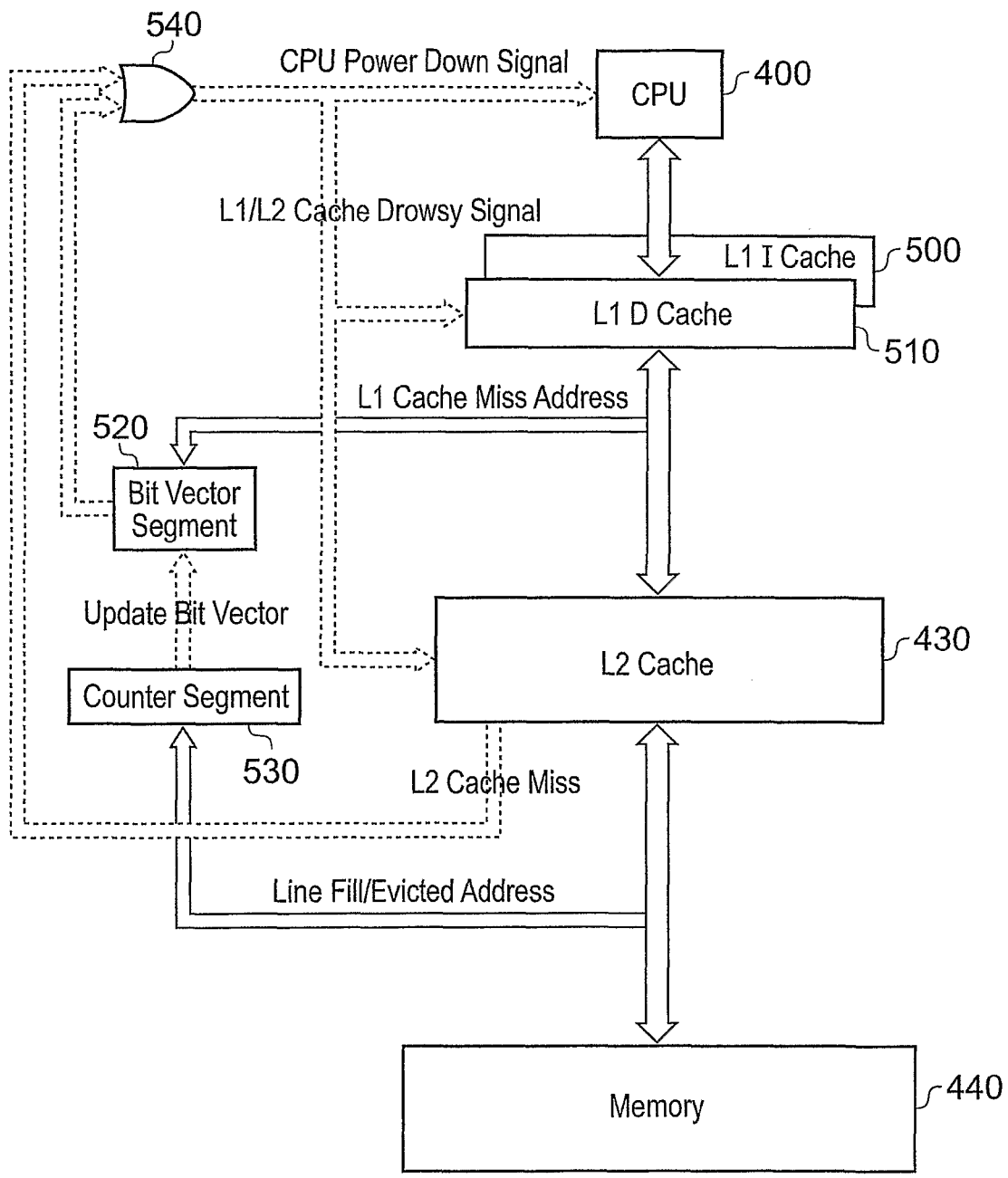
FIG. 6 is a block diagram illustrating in more detail the data processing apparatus of FIG. 4 in accordance with one embodiment.

FIG. 6 is a block diagram illustrating in more detail one particular embodiment of the apparatus of FIG. 4. As can be seen from FIG. 6, the CPU 400 can issue an access request to the level 1 cache, which in FIG. 6 is shown as consisting of a separate instruction cache 500 and data cache 510. The bit vector segment 520 of the segmented counting Bloom filter 420 is located between the level 1 cache and the level 2 cache 430, and in the event of a miss in the level 1 cache, the bit vector segment is arranged to snoop the address output from the level 1 cache to the level 2 cache, and can signal in a single cycle if the level 2 cache does not have the cache line indicated by that address. This cache miss indication can then be routed via the OR gate function 540 to the CPU 400 to cause the CPU 400 to implement an energy management process, and similarly this cache miss indication can be routed via the OR gate function 540 to the level 1 cache 500, 510 and the level 2 cache 430 to implement an energy management process, for example putting the caches into a drowsy mode of operation. The access to the level 2 cache can also be aborted.

As also shown in FIG. 6, the counter segment of the segmented counting Bloom filter 420 can be considered as existing at the same level of the memory hierarchy as the level 2 cache 430, and is updated based on the linefill and eviction activities occurring between the level 2 cache 430 and the memory 440. Whenever a particular entry in the counter segment 530 changes from a non-zero value to a zero value, or from a zero value to a non-zero value, the relevant vector entry in the bit vector segment 520 is updated.

As also shown in FIG. 6, an actual miss in the level 2 cache 430 can result in a signal being routed via the OR gate logic 540 to implement an energy management process in the CPU 400, and a corresponding energy management process in the caches.

Figure 7:
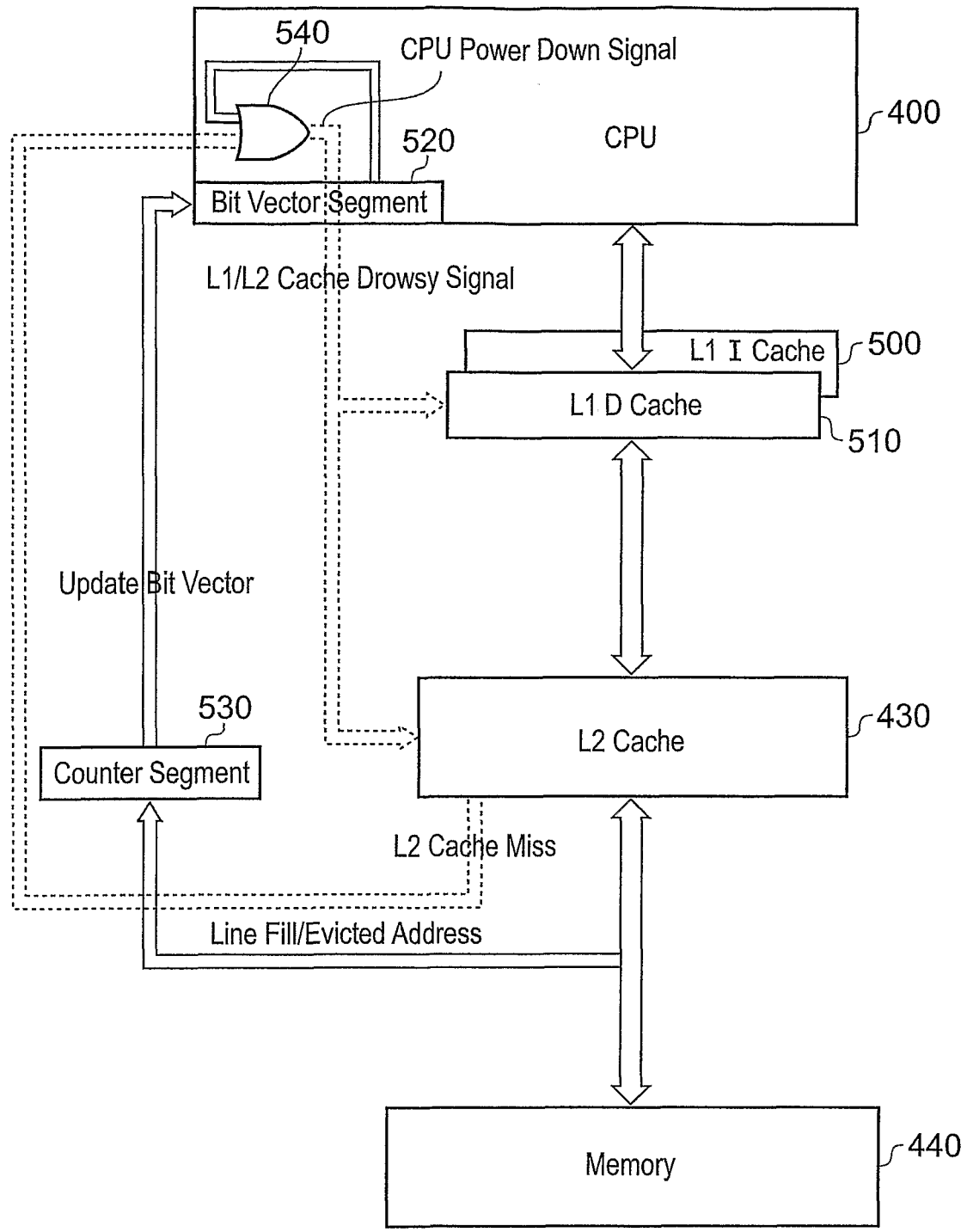
FIG. 7 is a block diagram illustrating in more detail the data processing apparatus of FIG. 4 in accordance with an alternative embodiment.

FIG. 7 illustrates an alternative design where the bit vector segment 520 resides within the CPU 400 itself, this design being useful for embodiments where the caches exhibit inclusive behaviour. Since the bit vector segment 520 is relatively small, it can be retained within a register or set of registers within the CPU 400. In this embodiment, the bit vector segment can monitor all accesses issued to the level 1 cache. If it is determined that such accesses will miss in the level 2 cache then it is also clear that the access will miss in the level 1 cache, if the inclusion property holds. Thus, in such embodiments, the access to both the level 1 cache and the level 2 cache can be aborted, providing further energy savings. The design of FIG. 7 can also be used for embodiments where the caches do not exhibit inclusive behaviour, since the cache miss indication logic will be used prior to the level 1 cache access, and in the event of a miss in the level 1 cache there is no need to propagate the request to the level 2 cache, thereby achieving power and performance benefits.

Hence, as is clear from FIGS. 6 and 7, by adopting the segmented approach, the bit vector segment 520 can reside between the level 1 and the level 2 caches, or even inside the core. Since the bit vector segment is much smaller than the counter segment 530, it provides a fast access time, whereas the larger counter segment 530 can be run at a lower frequency to save energy (which is acceptable since the operation of the counter segment is not time critical). The only additional overhead of this segmented approach is the duplication of the hash function hardware used to access the counter segment 530 and the bit vector segment 520. However, as discussed earlier, in one embodiment a single hash function can be used in that hardware, which simplifies the implementation and reduces the impact of the duplication of the hardware.

Figure 9:
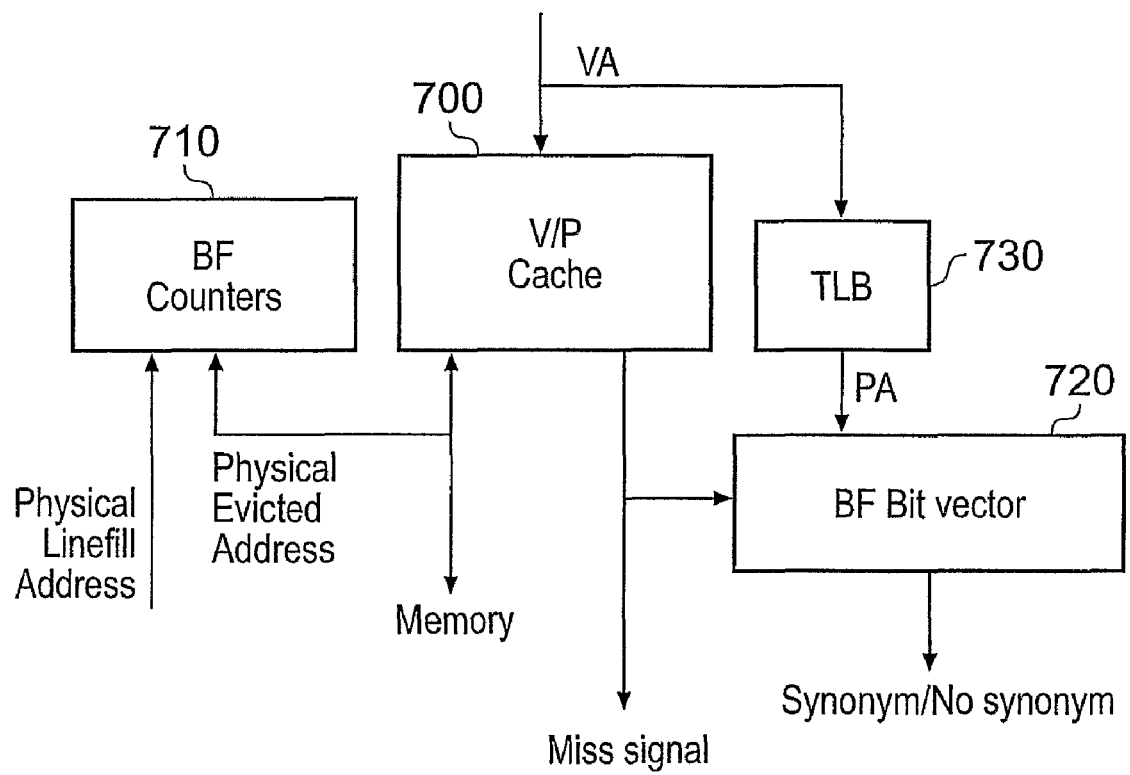
FIG. 9 is a diagram schematically illustrating the application of the segmented bloom filter of one embodiment in association with a virtually indexed physically tagged cache.
Figure 10:
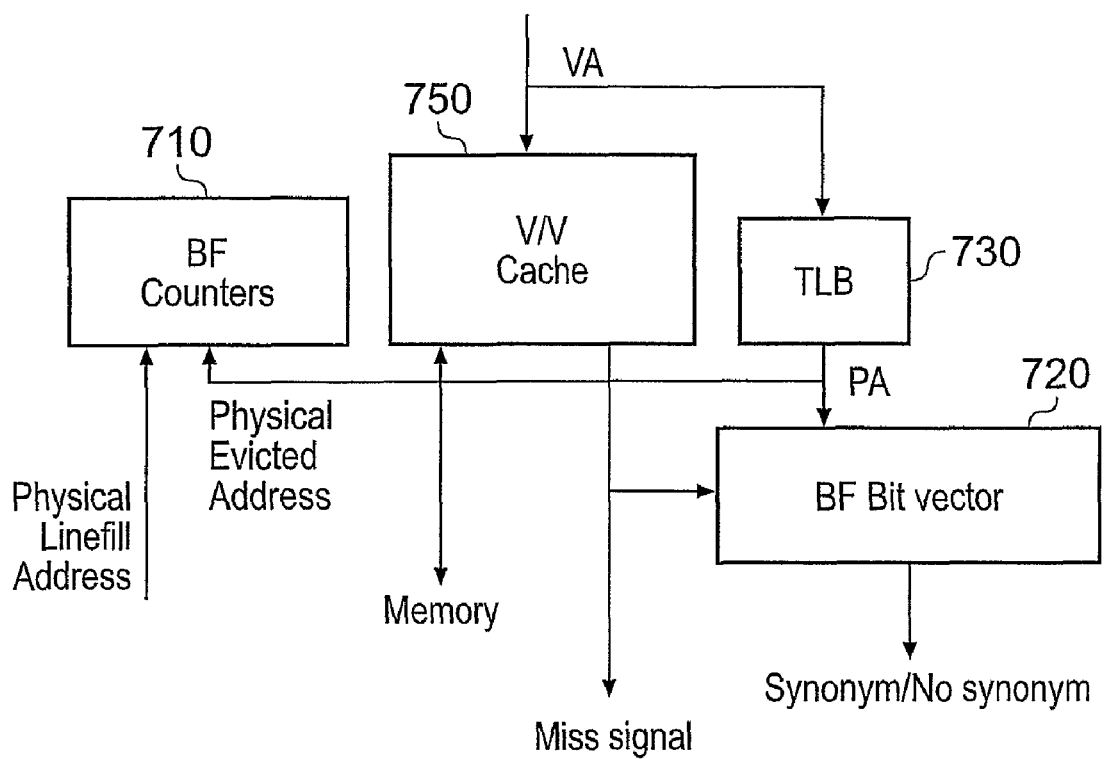
FIG. 10 is a diagram schematically illustrating the application of the segmented bloom filter of one embodiment in association with a virtually indexed virtually tagged cache.

For some implementations of cache, there may be a plurality of potential locations where the requested data value the subject of an access request could reside, and not all of these potential locations may be searchable via a single lookup in the cache. In such instances, when performing the lookup procedure the cache may be arranged to perform a sequence of lookups with each lookup relating to a subset of the potential locations. One particular example of a cache where this may occur is the so-called virtual cache, where the cache is accessed using a virtual address. FIGS. 9 and 10 illustrate how the segmented counting Bloom filter approach of one embodiment can be used in association with two such virtual caches, in particular FIG. 9 showing a virtually indexed, physically tagged cache, and FIG. 10 illustrating a virtually indexed virtually tagged cache.

An advantage of using a virtual cache is that the cache access time can be improved, since it is unnecessary to translate the virtual address to a physical address using table lookaside buffer (TLB) logic 730 to translate the virtual address to a physical address before the lookup takes place. However, one identified problem with virtual caches is the so-called synonym problem, which results from the possibility that multiple virtual addresses can map to the same physical address. The synonym problem occurs when the cache index bits use some of the bits from the virtual page number or superset bits for which the TLB address translation has not yet been performed. In such cases, an address tag can be located in multiple cache lines, so the tag lookup may need to be performed in multiple cache lines for direct-mapped caches and in multiple cache sets for set-associative caches. The superset bits determine the number of synonym sets.

One of the basic approaches for handling synonyms in virtual caches is to keep only a single copy in the cache. When there is a cache miss, the access request is sent to the lower level memory and all cache lines in every set in the superset are looked up for a potential synonym. For virtually-indexed physically-tagged caches, all physical tags in the superset are looked up for a synonym, and the access request is aborted and the cache line is moved to the indexed set if a synonym is found. The situation gets worse in virtually-indexed virtually-tagged caches, where every virtual tag must be translated into a physical tag and then each must be compared with the tag of the missed cache address in order to detect a synonym. When a synonym is found, the memory request is aborted and the cache line is remapped or retagged and the line can also be moved to the indexed set.

Thus, detecting synonyms is very slow and consumes power due to a potentially large number of tag lookups. The lookup speed will drop and the power will increase as the cache size and associativity gets larger. Given this problem, the segmented Bloom filter approach of embodiments of the present invention can be used to filter out several tag lookups and accordingly save energy. In particular, if the segmented Bloom filter can identify that there will be a miss in the cache, then the lookups can be aborted at an early stage. Since the segmented Bloom filter is only looking at physical addresses, it can quickly detect synonyms and save a lot of tag lookup power. In particular, it can determine from only checking a single bit location in the bit vector logic if a synonym is not-present, since if that lookup indicates that the data value is not in the cache, then there will also be no synonym in the cache. In particular, use of the segmented Bloom filter approach has the possibility of eliminating (w×n) tag lookup comparisons, where w is the cache associativity and n is the number of supersets, in situations where the segmented Bloom filter detects that there is no synonym.

As shown in FIG. 9, for virtually-indexed physically-tagged caches the bit vector logic 720 of the segmented Bloom filter keeps track of physical addresses translated by the TLB 730 rather than tracking virtual addresses. During a linefill, the counter logic 710 is accessed by the address of the linefill, which is the physical address sent by the lower level memory. Similarly, during a cache line eviction, the counter logic 720 is accessed by the physical index of the linefill and the physical tag of the evicted line since the tags in the cache are physical. When a cache miss occurs, the bit vector logic 720 is accessed by the physical address of the line, which is obtained from the TLB 730. If the output from the vector logic 720 indicates that there will be a cache miss, this means that there is no synonym in the cache 700 associated with the physical address. Accordingly, a significant number of lookups can be avoided in such situations.

As shown in FIG. 10, for virtually-indexed virtually-tagged caches, the counter logic 710 is accessed by the physical address of the linefill during the linefill process. However, for evictions the evicted address must be translated into the physical address by the TLB 730 before the counter logic 710 is accessed. The dirty evicted lines are already translated by the TLB before sending to the physical memory. Hence, the only extra TLB translations required are in association with clean evicted lines. When a cache miss occurs, the bit vector logic 720 is accessed by the physical address acquired from the TLB logic 730 in a similar way to that described earlier for the virtually-indexed physically tagged caches, and if the bit vector logic 720 indicates that there is a cache miss in the cache 750, then this means that there is no synonym in the cache associated with the physical address, and accordingly a significant number of lookups can be avoided.

Figure 11:
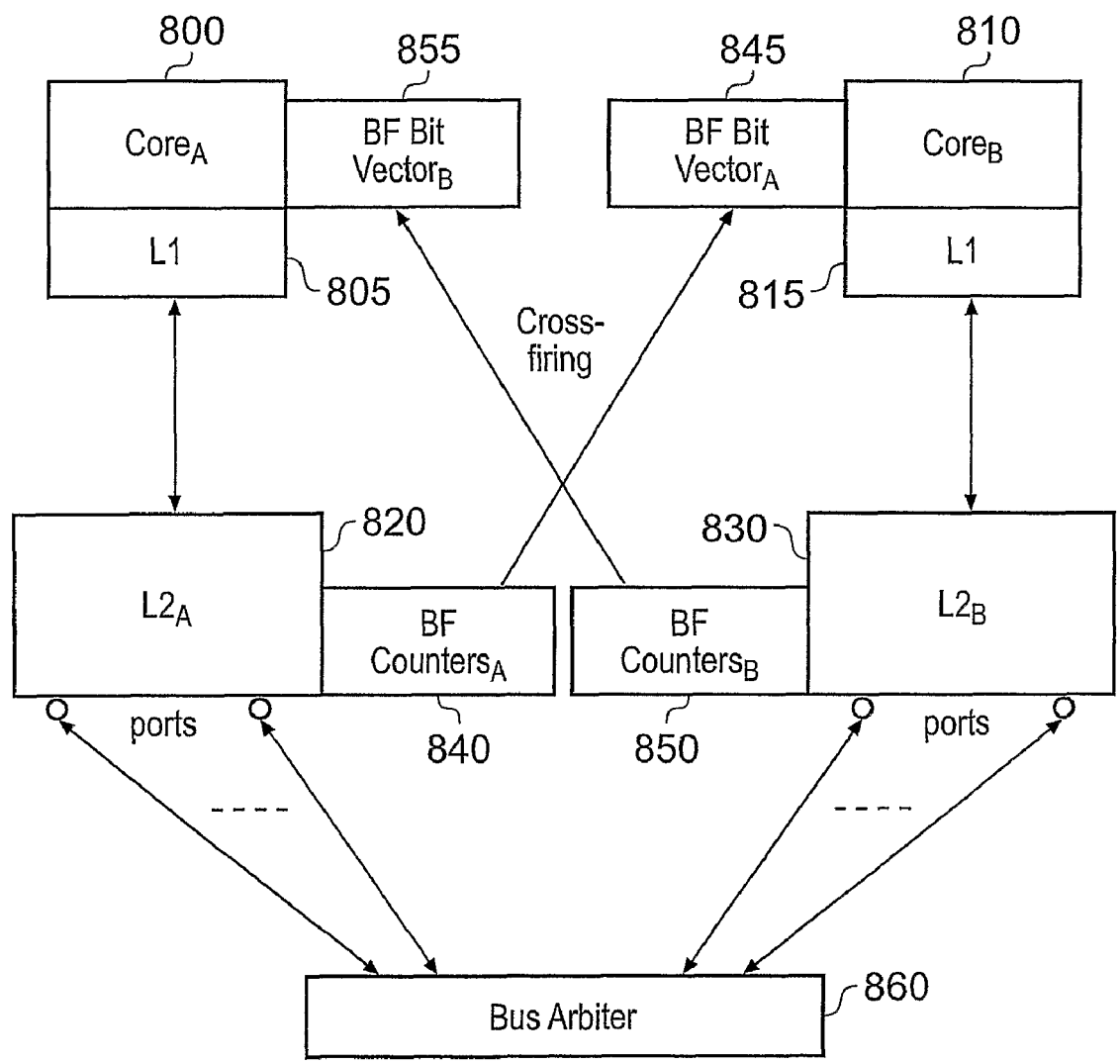
FIG. 11 is a block diagram illustrating a cross-firing technique used with a segmented bloom filter in accordance with one embodiment.

FIG. 11 illustrates another application of the segmented Bloom filter design in the context of a CMP system in which the level 2 cache is distributed amongst the various processor cores. This means that each processor core 800, 810 has a particular level 2 cache portion 820, 830, respectively, associated with it, but can also access the level 2 cache portions associated with other cores. Hence, by way of example, the core 800 has the level 2 cache portion 820 associated with it, but can also access the level 2 cache portion 830 associated with the core 810. Hence, the core 800 can allocate data within the level 2 cache portion 830 without replicating that data within its own level two cache portion 820. An analogous situation exists for the other core 810. In accordance with this model, victims from one level 2 cache can also be placed into other level 2 caches to increase the effective level 2 cache size.

Each level 2 cache portion has associated counter logic and vector logic forming a segmented Bloom filter design. Hence, the level 2 cache portion 820 has associated therewith the counter logic 840 and the bit vector logic 845 and similarly the level 2 cache portion 830 has associated therewith the counter logic 850 and the bit vector logic 855. However, as shown in FIG. 11, each core has access to the bit vector segments associated with level 2 cache portions other than the level 2 cache portion associated with that core. Hence, as shown, the core 800 has access to the bit vector logic 855 associated with the level 2 cache 830. Similarly, the core 810 has access to the bit vector logic 845 associated with the level 2 cache 820. The counter segments 840, 850 are updated in the usual manner, and are caused to update their associated bit vector segments as required when individual counter entries change from a zero to a non-zero value or from a non-zero value to a zero value. A core can then detect misses in the level 2 cache portions other than its associated level 2 cache portion early by performing an appropriate lookup in the relevant bit vector logic.

Since each core can access the various level 2 caches other than its own associated level 2 cache portion via the bus arbiter 860, the traffic through the bus arbiter 860 can potentially be very high. However, the bus congestion, arbiter queue size and the number of level 2 ports can be reduced by this cross-firing design illustrated in FIG. 11, since if the output from the bit vector logic indicates that a cache miss will occur, the cache access can be aborted early. Hence, as a particular example, if the core 800 wishes to issue an access request to the level 2 cache 830 via the bus arbiter 860, but the bit vector logic 855 issues an output signal indicating that a cache miss will occur, then that cache access can be aborted thereby reducing bus congestion.

Whilst in FIG. 11 only two cores are shown, it will be appreciated that the technique described therein can be generalised for an n-core model as well.

Figure 12:
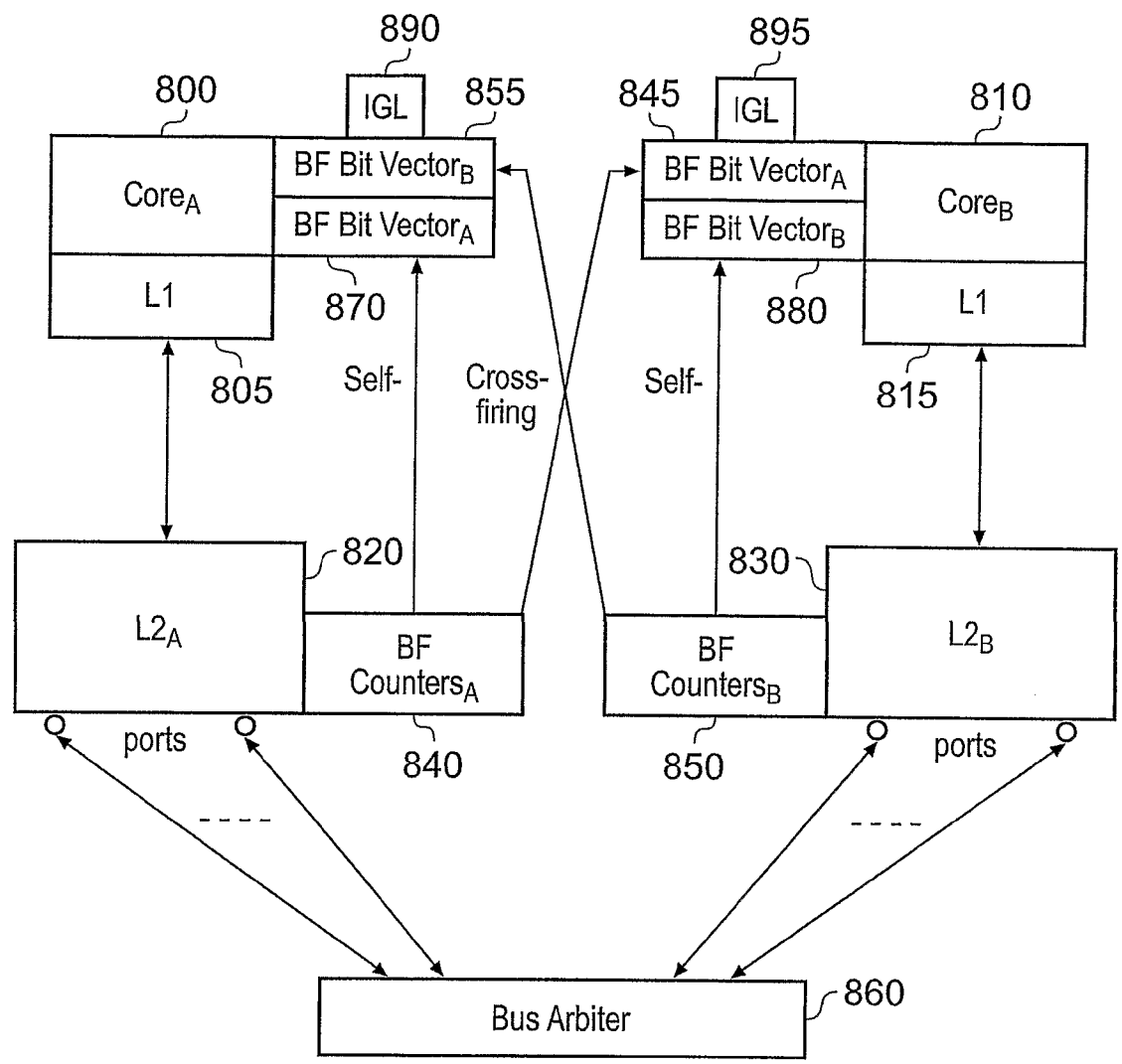
FIG. 12 is a diagram schematically illustrating the cross-firing technique employed in a further embodiment.

In an alternative embodiment illustrated in FIG. 12, each core can also have the bit vector segment associated with its own cache portion to further decrease access to the level 2 cache. Hence, core 800 can be provided with bit vector logic 870 associated with the level 2 cache 820, and core 810 can be provided with bit vector logic 880 associated with the level 2 cache 830. In this design, it should be noted that only the bit vector logic is replicated, and in contrast the counter logic is shared between the cross-firing and the local bit vector logic units. The various bit vector logic units accessible via a particular core can be accessed simultaneously using the same index generation logic 890, 895. Hence, with a single access using the index generation logic, a particular core can identify which level 2 portions, including its own, will result in a cache miss, thereby enabling an early abortion of those cache lookups.

It should noted that the demand for level 2 bandwidth will increase if each core also has an n-way SMT design. Hence, this will further complicate the design of the bus arbiter 860 and the level 2 caches with multiple ports, thereby increasing their cost. This cost can be mitigated by using the cross-firing design of segmented Bloom filter illustrated schematically in FIGS. 11 and 12.

From the above description of various embodiments, it will be appreciated that the cache miss indication logic designs described herein enable a number of power saving and performance improvements to be realised. The segmented Bloom filter design enables lookups to the vector logic to be fast and consume low power. Further, the flexibility to place the vector logic at locations within the data processing apparatus separate to the associated counter logic produces further flexibility which can result in further efficiencies.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A data processing apparatus comprising:
    processing logic operable to execute a plurality of program threads;
    a cache operable to store data values for access by the processing logic, the processing logic being operable when access to a data value is required whilst executing a first program thread to issue an access request specifying an address in memory associated with that data value, and the cache being operable in response to the address to perform a lookup procedure to determine whether the data value is stored in the cache;
    indication logic operable in response to an address portion of the address to provide an indication as to whether the data value is stored in the cache, said indication being produced before a result of the lookup procedure is available, and the indication logic being operable to only issue an indication that the data value is not stored in the cache if that indication is guaranteed to be correct; and
    control logic operable, if the indication indicates that the data value is not stored in the cache, to use said indication to control a process having an effect on a program thread other than the first program thread;
    the processing logic comprising a plurality of processors each sharing access to the cache, and each being operable when access to a data value is required to issue an access request specifying an address in memory associated with that data value;
    the plurality of program threads being distributed across the plurality of processors;
    the indication logic being operable in response to at least some of the access requests to provide said indication; and
    the control logic comprising arbitration logic operable to perform an arbitration process to arbitrate access to the cache between the plurality of processors, the process controlled by said indication being the arbitration process, and the arbitration logic being arranged to use the indications provided by the indication logic when performing said arbitration process, wherein the indication logic comprises:
    counter logic having a plurality of counter entries, each counter entry containing a count value;
    vector logic having a vector entry for each counter entry in the counter logic, each vector entry containing a value which is set when the count value in the corresponding counter entry changes from a zero value to a non-zero value, and which is cleared when the count value in the corresponding counter entry changes from a non-zero value to a zero value;
    index generation logic operable to generate from an address portion of an address at least one index, each index identifying a counter entry and associated vector entry;
    the index generation logic being operable whenever a data value is stored in, or removed from, the cache to generate from the address portion of the associated address said at least one index, and to cause the count value in each identified counter entry to be incremented if the data value is being stored in the cache or decremented if the data value is being removed from the cache;
    the index generation logic further being operable for at least some access requests to generate from the address portion of the associated address said at least one index, and to cause the vector logic to generate an output signal based on the value in each identified vector entry, the output signal indicating if the data value of the access request is not stored in the cache, wherein:
    a memory hierarchy exists within the data processing apparatus having a number of memory levels, the cache being provided at one of said memory levels, and when processing access requests memory levels higher in the hierarchy being accessed before memory levels lower in the hierarchy; and
    whilst the vector logic and the counter logic are both associated with the cache, the vector logic is accessible separately to the counter logic and from a different level in the memory hierarchy to that memory level from which the counter logic is accessible.

2. A data processing apparatus as claimed in claim 1, further comprising additional control logic operable in response to said indication to control a process having an effect on the first program thread.

3. A data processing apparatus as claimed in claim 1, wherein:
    the processing logic comprises a number of shared resources, each shared resource being allocatable to one of the program threads; and
    the control logic is further operable, if the indication indicates that the data value is not stored in the cache, to cause the processing logic to perform a reallocation of at least one shared resource.

4. A data processing apparatus as claimed in claim 1, wherein the indication logic comprises a plurality of indication units, each indication unit being associated with one of said processors and being operable in response to the address portion of an access request issued by the associated processor to provide said indication as to whether the data value is stored in the cache;
    the control logic being operable to use the indications provided by each of the indication units when performing said arbitration process.

5. A data processing apparatus comprising:
    processing logic;
    a cache operable to store data values for access by the processing logic, the processing logic being operable when access to a data value is required to issue an access request specifying an address in memory associated with that data value, and the cache being operable in response to the address to perform a lookup procedure to determine whether the data value is stored in the cache;
    counter logic having a plurality of counter entries, each counter entry containing a count value;
    vector logic having a vector entry for each counter entry in the counter logic, each vector entry containing a value which is set when the count value in the corresponding counter entry changes from a zero value to a non-zero value, and which is cleared when the count value in the corresponding counter entry changes from a non-zero value to a zero value;

index generation logic comprising first index generation logic associated with the counter logic and operable to generate from an address portion of an address at least one index identifying one or more counter entries in the counter logic, and second index generation logic associated with the vector logic and operable to generate from an address portion of an address at least one index identifying one or more vector entries in the vector logic;

the first index generation logic being operable whenever a data value is stored in, or removed from, the cache to generate from the address portion of the associated address said at least one index, and to cause the count value in each identified counter entry to be incremented if the data value is being stored in the cache or decremented if the data value is being removed from the cache;

the second index generation logic further being operable for at least some access requests to generate from the address portion of the associated address said at least one index, and to cause the vector logic to generate an output signal based on the value in each identified vector entry, the output signal indicating if the data value of the access request is not stored in the cache;

wherein a memory hierarchy exists within the data processing apparatus having a number of memory levels, the cache being provided at one of said memory levels, and when processing access requests memory levels higher in the hierarchy being accessed before memory levels lower in the hierarchy; and whilst the vector logic and the counter logic are both associated with the cache, the vector logic is accessible separately to the counter logic and from a different level in the memory hierarchy to that memory level from which the counter logic is accessible.

6. A data processing apparatus as claimed in claim 5, further comprising lookup control logic operable in response to said output signal from the vector logic to abort the lookup procedure if the output signal indicates that the data value is not stored in the cache.

7. A data processing apparatus as claimed in claim 5, wherein:

the processing logic is operable to execute a sequence of instructions in order; and if the output signal from the vector logic indicates that the data value is not stored in the cache, the processing logic is operable to perform an energy management process to reduce energy consumption of the processing logic whilst waiting for the data value to be accessed.

8. A data processing apparatus as claimed in claim 7, further comprising:

an additional cache, if on issuance of the access request by the processing logic a lookup is performed in the additional cache resulting in a miss in the additional cache, the cache being operable to perform said lookup procedure; and if the output signal from the vector logic indicates that the data value is not stored in the cache, at least one of the cache and additional cache being operable to perform an energy management process to reduce energy consumption whilst waiting for the data value to be accessed.

9. A data processing apparatus as claimed in claim 5, further comprising:

an additional cache, if on issuance of the access request by the processing logic a lookup is performed in the additional cache resulting in a miss in the additional cache, the cache being operable to perform said lookup procedure, the cache and additional cache exhibiting inclusive behaviour; and if the output signal from the vector logic indicates that the data value is not stored in the cache the lookup in the additional cache being aborted.

10. A data processing apparatus as claimed in claim 5, wherein:

the vector logic is accessible prior to the access request being processed by the memory level in which the cache is provided.

11. A data processing apparatus as claimed in claim 10, further comprising:

an additional cache at a higher memory level than said cache, if on issuance of the access request by the processing logic a lookup is performed in the additional cache resulting in a miss in the additional cache, said cache being operable to perform said lookup procedure; and the vector logic being accessed in response to a cache miss signal issued by the additional cache in the event of a cache miss in the additional cache, thereby causing the vector logic to generate said output signal.

12. A data processing apparatus as claimed in claim 10, further comprising:

an additional cache at a higher memory level than said cache, if on issuance of the access request by the processing logic a lookup is performed in the additional cache resulting in a miss in the additional cache, said cache being operable to perform said lookup procedure, said cache and said additional cache exhibiting inclusive behaviour; and the vector logic being located within the processing logic and being accessed for every access request, thereby causing the vector logic to generate said output signal.

13. A data processing apparatus as claimed in claim 5, wherein:

the processing logic comprises a plurality of processors, each processor being operable when access to a data value is required to issue an access request specifying an address in memory associated with that data value;

the cache comprises a plurality of cache portions, each cache portion associated with one of said processors, and each cache portion being accessible by said plurality of processors;

separate counter logic, vector logic and index generation logic being provided in association with each cache portion;

the vector logic associated with at least one cache portion being accessed for access requests issued by a processor with which the at least one cache portion is not associated.

14. A data processing apparatus as claimed in claim 13, wherein the vector logic is replicated for each processor.

15. A data processing apparatus as claimed in claim 5, wherein:

the cache has a plurality of potential locations where the data value the subject of the access request may reside, when performing the lookup procedure the cache being operable to perform a sequence of lookups, each lookup relating to a subset of said potential locations; and if the output signal from the vector logic indicates that the data value is not in the cache, the sequence of lookups being terminated.

16. A method of operating a data processing apparatus having processing logic for executing a plurality of program threads, and a cache for storing data values for access by the processing logic, the processing logic comprising a plurality of processors each sharing access to the cache, and the plurality of program threads being distributed across the plurality of processors, the method comprising the steps of:

issuing, when access to a data value is required whilst the processing logic is executing a first program thread, an access request specifying an address in memory associated with that data value;

performing, in response to the address, a lookup procedure in the cache to determine whether the data value is stored in the cache;

employing indication logic, in response to an address portion of the address, to provide an indication as to whether the data value is stored in the cache, said indication being produced before a result of the lookup procedure is available, and the indication logic only issuing an indication that the data value is not stored in the cache if that indication is guaranteed to be correct; and using, if the indication indicates that the data value is not stored in the cache, said indication to control a process having an effect on a program thread other than the first program thread; each processor, when access to a data value is required, issuing an access request specifying an address in memory associated with that data value, and the indication logic being responsive to at least some of the access requests to provide said indication; and the process controlled by said indication is an arbitration process performed to arbitrate access to the cache between the plurality of processors, the arbitration process using the indications provided by the indication logic when performing said arbitration process;

providing the indication logic with counter logic having a plurality of counter entries, each counter entry containing a count value, and vector logic having a vector entry for each counter entry in the counter logic, each vector entry containing a value which is set when the count value in the corresponding counter entry changes from a zero value to a non-zero value, and which is cleared when the count value in the corresponding counter entry changes from a non-zero value to a zero value;

generating from an address portion of an address at least one index, each index identifying a counter entry and associated vector entry;

generating, whenever a data value is stored in or removed from the cache, from the address portion of the associated address said at least one index, and causing the count value in each identified counter entry to be incremented if the data value is being stored in the cache or decremented if the data value is being removed from the cache;

generating, for at least some access requests, from the address portion of the associated address said at least one index, and causing the vector logic to generate an output signal based on the value in each identified vector entry, the output signal indicating if the data value of the access request is not stored in the cache;

wherein a memory hierarchy exists within the data processing apparatus having a number of memory levels, the cache being provided at one of said memory levels, and when processing access requests memory levels higher in the hierarchy being accessed before memory levels lower in the hierarchy; and whilst the vector logic and the counter logic are both associated with the cache, the vector logic is accessible separately to the counter logic and from a different level in the memory hierarchy to that memory level from which the counter logic is accessible.

17. A method of operating a data processing apparatus, the data processing apparatus comprising processing logic, a cache for storing data values for access by the processing logic, counter logic associated with the cache and having a plurality of counter entries, each counter entry containing a count value, and vector logic associated with the cache and having a vector entry for each counter entry in the counter logic, each vector entry containing a value which is set when the count value in the corresponding counter entry changes from a zero value to a non-zero value, and which is cleared when the count value in the corresponding counter entry changes from a non-zero value to a zero value, the method comprising the steps of:

when access to a data value is required by the processing logic, issuing an access request specifying an address in memory associated with that data value;

in response to the address, performing a lookup procedure in the cache to determine whether the data value is stored in the cache;

whenever a data value is stored in, or removed from, the cache, employing first index generation logic to generate from the address portion of the associated address at least one index, each index identifying a counter entry, and causing the count value in each identified counter entry to be incremented if the data value is being stored in the cache or decremented if the data value is being removed from the cache;

for at least some access requests, employing second index generation logic to generate from the address portion of the associated address at least one index, each index identifying a vector entry, and causing the vector logic to generate an output signal based on the value in each identified vector entry, the output signal indicating if the data value of the access request is not stored in the cache;

wherein a memory hierarchy exists within the data processing apparatus having a number of memory levels, the cache being provided at one of said memory levels, and when processing access requests memory levels higher in the hierarchy being accessed before memory levels lower in the hierarchy; and said method further comprising the step of accessing the vector logic separately to the counter logic and from a different level in the memory hierarchy to that memory level from which the counter logic is accessible.

* * * * *